(12) United States Patent
Nitta et al.

(10) Patent No.: US 6,229,825 B1
(45) Date of Patent: May 8, 2001

(54) INFORMATION CONSISTENCY APPARATUS AND METHOD

(75) Inventors: Minoru Nitta; Takayo Oba; Katsuhiko Tomita; Toshimoto Katsuchi; Hiroyuki Murai, all of Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/042,792

(22) Filed: Mar. 17, 1998

(30) Foreign Application Priority Data

Oct. 20, 1997 (JP) .................................................. 9-287321

(51) Int. Cl.[7] ....................................................... H04J 3/16
(52) U.S. Cl. ............................................................. 370/498
(58) Field of Search .................................... 370/498, 465, 370/466, 428, 259, 260, 263, 264, 442, 347; 700/257; 345/327, 6, 722, 328; 709/217, 218, 219; 379/220

(56) References Cited

U.S. PATENT DOCUMENTS 4,835,730 * 5/1989 Shimano et al. ......................... 707/1
6,049,332 * 4/2000 Boetji et al. ........................... 345/327

FOREIGN PATENT DOCUMENTS 0 497 022    8/1992   (EP) .
2 284 969    6/1995   (GB) .

* cited by examiner

*Primary Examiner*—Dang Ton
(74) *Attorney, Agent, or Firm*—Staas & Halsey LLP

(57) ABSTRACT

An information inconsistency judgment apparatus, an information inconsistency judgment method, and a medium recorded with an information inconsistency judgment program, for judging as to whether an inconsistency has occurred in a transmitted information, based on an object at a higher level of the object to be operated, and on the registered object. An information inconsistency correction apparatus, an information inconsistency correction method, and a medium recorded with an information inconsistency correction program, for correcting the registered object based on an operational information, when it is judged that an inconsistency has occurred in the transmitted information.

38 Claims, 24 Drawing Sheets

INFORMATION CONSISTENCY APPARATUS AND METHOD

BACKGROUND OF THE INVENTION

(1) Field of the Invention

The present invention relates to a store-and-forward type of electronic conference system, and particularly to a technique for automatically judging or correcting, when occurred, an inconsistency in the contents of informations to be exchanged.

(2) Related art of the Invention

Generally, an "electronic conference system" designates or specifies those systems constituted for information-exchange between unspecified number of users. In a large-scale electronic conference system, the users of the electronic conference system are registered at each of geographically separated areas (hereinafter called "site"). The registered user can use only the site at which he has been registered.

In such an electronic conference system, there is generally adopted a store-and-forward type of communication system, such as in view of transmission speed of communication lines connecting between the sites. That is, the information generated at each of the sites is once stored into a transmission queue which stores informations to be transmitted, and then collectively or batch transmitted at each of a predetermined time of period. The information received at each sites other than the transmitting sites is once stored into a reception queue for storing received informations, and then processed by that background which has processing ability to spare.

Typically, electronic conference systems utilize those unit containers named "forum" established in a hierarchy structure. In turn, each of the forums includes hierarchical messages as informations, also in a hierarchy structure.

However, in such an electronic conference system, there is adopted the store-and-forward type of communication system, so that there may occur inconsistency in the informations to be transmitted. For example, it is now assumed that the informations are exchanged between a forum A of a site A and a forum A of a site B, and forums B, B are established at the lower levels of sites A, A, respectively. Under this state, there may be lost the forum A and its lower level of forum B both at the site B, due to a certain cause (for example, cut-off of power such as due to power failure). Then may occur such a situation that the forums in site B are recovered based on the contents of a recovery disk, to cause the state in which the forum B had not been established at the lower level of the forum A in site B, due to the oldness of the recovery disk. Under such a state, if it is tried by the site A to write (i.e., create) a message into the vanished forum B of site B, an informational operation is performed at site B for the not existing forum B. Thus, inconsistency in information contents should occur.

In the conventional technique, it has been difficult to find out such an information inconsistency even when it happened, resulting in such a situation that the administrator of the electronic conference system could not get aware of it for a long time. This situation is not so problematical, insofar as the exchangee-information to be exchanged between each of the sites is not so important. However, the situation is problematic if the information is extremely important or a prompt treatment is required, since an inconsistency, if any, in the transmittee information may result in that the transmitted information is not correctly reflected at the site which receives this information.

SUMMARY OF THE INVENTION

In view of the aforementioned problems in the conventional technique, it is therefore a purpose of the present invention to automatically judge or correct an inconsistency, when occurred, in the informations to be transmitted, so that the transmitted informations are correctly reflected, to thereby improve the reliability of the electronic conference system.

It is another purpose of the present invention to distribute those mediums which are recorded with the information inconsistency judgment program and those mediums which are recorded with the information inconsistency correction program, both according to the present invention, to thereby promote those persons, who have obtained such mediums, to easily constitute, an information inconsistency judgment apparatus and an information inconsistency correction apparatus.

A first solution for achieving the above purposes is constituted by an information inconsistency judgment apparatus in a store-and-forward type of electronic conference system in which operational informations representing operations performed for hierarchical objects are stored and the stored operational informations are batch transmitted between information administrating devices which register and administrate the hierarchical objects, wherein the operational information includes a higher-level-information which specifies an object at the higher level of the treatee object, and the apparatus comprising an inconsistency judgment device for judging as to whether an inconsistency has occurred in the transmitted operational information or not, at the time of treatment of the received operational information, based on the object which is specified by the higher-level-information and that object which is registered in the information administrating device.

According to such a constitution, the operational information to be transmitted and received between the information administrating devices includes a higher-level-information which specifies an object at the higher level of the treatee information. Further, at the information administrating device which has received the operational information, it is judged as to whether an inconsistency has occurred in the transmitted operational information or not, at the time of treatment of the received operational information, based on the object which is specified by the higher level information and the object which is registered in the information administrating device. As such, it is automatically detected that an inconsistency has occurred in the transmitted information. Thus, such as an administrator of the store-and-forward type of electronic conference system can, at an early stage, find out an occurrence of inconsistency, so that the maintenance therefor can be also performed at an early stage. As a result, the transmitted operational information can be correctly reflected, so that the reliability of the electronic conference system can be improved.

The inconsistency judgment device may be constituted to judge that an inconsistency has occurred in the transmitted operational information, when the object which is specified by the higher-level-information is not registered in the information administrating device.

According to such a constitution, it is judged that an inconsistency has occurred in the transmitted operational information, when the object which is specified by the higher-level-information is not registered in the information administrating device. Namely, the objects are to be registered in a hierarchy manner, which basically necessitates an object at a higher level of those objects to be registered. As such, it is possible to judge as to whether an inconsistency has occurred in the operational information or not, by the constitution noted just above. Therefore, it can be easily judged that an inconsistency has occurred in the transmitted operational information, so that an increase of load in the system can be restrained to the utmost.

Further, the apparatus may further comprise a deletion information registration device for registering deletion information which specifies the object which has been deleted from the information administrating device, wherein the inconsistency judging device may be constituted to judge as to whether an inconsistency has occurred in the transmitted operational information or not, when the object which is specified by the higher-level-information is not registered in the deletion information registration device.

According to such a constitution, it is judged as to whether an inconsistency has occurred in the transmitted operational information or not, when the object which is specified by the higher-level-information is not registered in the deletion information registration device. Namely, if the object which is specified by the higher-level-information is registered in the deletion information registration means, the specified object has been deleted before the operational information is transmitted from other information administrating devices. In this case, it can be judged that no inconsistency has occurred in the transmitted operational information. Thus, the precision in the information inconsistency judgment can be improved, and the reliability of the electronic conference system can be further improved.

Further, the apparatus may further comprise a creation judgment device for judging as to whether the operation type is a creation of an object at a highest level or not, based on the received operation information, wherein the inconsistency judgment device may be constituted to judge as to whether an inconsistency has occurred in the transmitted operational information or not, when the creation judgment device has judged that the operation type is other than a creation of an object at a highest level.

According to such a constitution, when the operation type is a creation of an object at a highest level, there is not performed the judgment as to whether an inconsistency has occurred in the transmitted operational information, or not. Namely, an object at a highest level does not have any higher levels, so that the information inconsistency judgment is not performed when a creation of object at a highest level is to be performed. Thus, the precision in the information inconsistency judgment can be improved, and the reliability of the electronic conference system can be further improved.

A second solution is constituted by an information inconsistency correction apparatus in a store-and-forward type of electronic conference system in which operational informations representing operations performed for hierarchical objects are stored and the stored operational informations are batch transmitted between information administrating devices which register and administrate the hierarchical objects, wherein the operational information includes a higher-level-information which specifies an object at the higher level of the treatee object, and the apparatus comprising an inconsistency judgment device for judging as to whether an inconsistency has occurred in the transmitted operational information or not, at the time of treatment of the received operational information, based on the object which is specified by the higher-level-information and the object which is registered in the information administrating device, and an inconsistency correction device for correcting the object which is registered in the information administrating device, based on the transmitted operational information, when the inconsistency judgment device has judged that an inconsistency has occurred in the transmitted operational information.

According to such a constitution, the operational information to be transmitted and received between the information administrating devices includes a higher-level-information which specifies an object at the higher level of the treatee information. Further, at the information administrating device which has received the operational information, it is judged as to whether an inconsistency has occurred in the transmitted operational information or not, at the time of treatment of the received operational information, based on the object which is specified by the higher level information and the object which is registered in the information administrating device. When it is judged that an inconsistency has occurred in the transmitted operational information, the object which is registered in the information administrating device is corrected based on the operational information. As such, the object which is registered in the information administrating device is automatically corrected, when an inconsistency has occurred in the transmitted operational information. Thus, the transmitted operational information can be correctly reflected, so that the reliability of the electronic conference system can be improved. Additional effect is that the maintenance of the electronic conference system is facilitated.

The inconsistency judgment device may be constituted to judge that an inconsistency has occurred in the transmitted operational information, when the object which is specified by the higher-level-information is not registered in the information administrating device.

According to such a constitution, it is judged that an inconsistency has occurred in the transmitted operational information, when the object which is specified by the higher-level-information is not registered in the information administrating device. Thus, similar to the above mentioned information inconsistency judgment apparatus, it can be easily judged that an inconsistency has occurred in the transmitted operational information, so that an increase of load in the system can be restrained to the utmost.

The apparatus may further comprise a deletion information registration device for registering deletion information which specifies the object which has been deleted from the information administrating device, wherein the inconsistency judging device may be constituted to judge as to whether an inconsistency has occurred in the transmitted operational information or not, when the object which is specified by the higher-level-information is not registered in the deletion information registration device.

According to such a constitution, it is judged as to whether an inconsistency has occurred in the transmitted operational information or not, when the object which is specified by the higher-level-information is not registered in the deletion information registration device. Thus, similar to the aforementioned information inconsistency judgment apparatus, the precision in the information inconsistency judgment can be improved, and the reliability of the electronic conference system can be further improved.

Further, the operational information may include a transmitterinformation specifying the information administrating device which transmitted the operational information itself, and the inconsistency correction device may be constituted to correct the object registered in the information administrating device, by obtaining objects from the information administrating means which is specified by the transmitter-information.

According to such a constitution, the object registered in the information administrating device is corrected by obtaining the hierarchical objects from the information administrating device which is specified by the received transmitter-information. Namely, the hierarchical objects can be regarded as being registered without any inconsistency in the information administrating device which transmitted the operational information, so that the object at issue is corrected based on those objects which are registered in the information administrating device which transmitted the information. Thus, the inconsistency correction for the transmitted operational information can be easily performed, so that an increase of load in the system can be restrained to the utmost.

In addition, the apparatus may further comprise a creation judgment device for judging as to whether the operation type is a creation of an object at a highest level or not, based on the received opertional information, wherein the inconsistency judgment device may be constituted to judge as to whether an inconsistency has occurred in the transmitted operational information or not, when the creation judgment device has judged that the operation type is other than a creation of an object at a highest level.

According to such a constitution, when the operation type is a creation of an object at a highest level, there is not performed the judgment as to whether an inconsistency has occurred in the transmitted operational information, or not. Thus, similar to the aforementioned information inconsistency judgment apparatus, the precision in the information inconsistency judgment can be improved, and the reliability of the electronic conference system can be further improved.

A third solution is constituted by an information inconsistency judgment method in a store-and-forward type of electronic conference system in which operational informations representing operations performed for hierarchical objects are stored and the stored operational informations are batch transmitted between information administrating processes which register and administrate the hierarchical objects, wherein the operational information includes a higher-level-information which specifies an object at the higher level of the treatee object, and the method comprises an inconsistency judgment process for judging as to whether an inconsistency has occurred in the transmitted operational information or not, at the time of treatment of the received operational information, based on the object which is specified by the higher-level-information and the object which is registered in the information administrating process.

According to such a constitution, the operational information to be transmitted and received between the information administrating processes includes a higher-level-information which specifies an object at the higher level of the treatee information. Further, at the information administrating process which has received the operational information, it is judged as to whether an inconsistency has occurred in the transmitted operational information or not, at the time of treatment of the received operational information, based on the object which is specified by the higher level information and the object which is registered in the information administrating process. As such, it is automatically detected that an inconsistency has occurred in the transmitted information. Thus, such as an administrator of the store-and-forward type of electronic conference system can, at an early stage, find out an occurrence of inconsistency, so that the maintenance therefor can be also performed at an early stage. As a result, the transmitted operational information can be correctly reflected, so that the reliability of the electronic conference system can be improved.

The inconsistency judgment process may be constituted to judge that an inconsistency has occurred in the transmitted operational information, when the object which is specified by the higher-level-information is not registered in the information administrating process.

According to such a constitution, it is judged that an inconsistency has occurred in the transmitted operational information, when the object which is specified by the higher-level-information is not registered in the information administrating process. Namely, the objects are to be registered in a hierarchy manner, which basically necessitates an object at a higher level of those objects to be registered. As such, it is possible to judge as to whether an inconsistency has occurred in the operational information or not, by the constitution noted just above. Therefore, it can be easily judged that an inconsistency has occurred in the transmitted operational information, so that an increase of load in the system can be restrained to the utmost.

A fourth solution is constituted by an information inconsistency correction method in a store-and-forward type of electronic conference system in which operational informations representing operations performed for hierarchical objects are stored and the stored operational informations are batch transmitted between information administrating processes which register and administrate the hierarchical objects, wherein the operational information includes a higher-level-information which specifies an object at the higher level of the treatee object, and the method comprises an inconsistency judgment process for judging as to whether an inconsistency has occurred in the transmitted operational information or not, at the time of treatment of the received operational information, based on the object which is specified by the higher-level-information and the object which is registered in the information administrating process, and an inconsistency correction process for correcting the object which is registered in the information administrating process, based on the transmitted operational information, when the inconsistency judgment process has judged that an inconsistency has occurred in the transmitted operational information.

According to such a constitution, the operational information to be transmitted and received between the information administrating processes includes a higher-level-information which specifies an object at the higher level of the treatee information. Further, at the information administrating process which has received the operational information, it is judged as to whether an inconsistency has occurred in the transmitted operational information or not, at the time of treatment of the received operational information, based on the object which is specified by the higher level information and the object which is registered in the information administrating process. When it is judged that an inconsistency has occurred in the transmitted operational information, the object which is registered in the information administrating process is corrected based on the operational information. As such, the object which is registered in the information administrating process is automatically corrected, when an inconsistency has occurred in the transmitted operational information. Thus, the transmitted operational information can be correctly reflected, so that the reliability of the electronic conference system can be improved. Additional effect is that the maintenance of the electronic conference system is facilitated.

The inconsistency judgment process may be constituted to judge that an inconsistency has occurred in the transmitted operational information, when the object which is specified by the higher-level-information is not registered in the information administrating process.

According to such a constitution, it is judged that an inconsistency has occurred in the transmitted operational information, when the object which is specified by the higher-level-information is not registered in the information administrating process. Thus, similar to the above mentioned information inconsistency judgment method, it can be easily judged that an inconsistency has occurred in the transmitted operational information, so that an increase of load in the system can be restrained to the utmost.

The operational information may include a transmitter-information specifying the information administrating process which transmitted the operational information itself, and the inconsistency correction process may be constituted to correct the object registered in the information administrating process, by obtaining objects from the information administrating process which is specified by the transmitter-information.

According to such a constitution, the object registered in the information administrating process is corrected by obtaining the hierarchical objects from the information administrating process which is specified by the received transmitter-information. Namely, the hierarchical objects can be regarded as being registered without any inconsistency in the information administrating process which transmitted the operational information, so that the object at issue is corrected based on those objects which are registered in the information administrating process which transmitted the operational information. Thus, the inconsistency correction for the transmitted operational information can be easily performed, so that an increase of load in the system can be restrained to the utmost.

A fifth solution is constituted by a medium recorded with an information inconsistency judgment program in a store-and-forward type of electronic conference system in which operational informations representing operations performed for hierarchical objects are stored and the stored operational informations are batch transmitted between information administrating functions which register and administrate the hierarchical objects, wherein the operational information includes a higher-level-information which specifies an object at the higher level of the treatee object, and the medium is recorded with a program for realizing an inconsistency judgment function for judging as to whether an inconsistency has occurred in the transmitted operational information or not, at the time of treatment of the received operational information, based on the object which is specified by the higher-level-information and the object which is registered in the information administrating function.

In this respect, the term "medium" is readable such as onto paper card (punch card), paper tape, magnetic tape, magnetic disk, magnetic drum, CD-ROM, IC card, which can assuredly record various informations which can be assuredly read out if required.

According to such a constitution, the operational information to be transmitted and received between the information administrating functions includes a higher-level-information which specifies an object at the higher level of the treatee information. Further, the medium is recorded with a program for realizing an inconsistency judgment function for judging as to whether an inconsistency has occurred in the transmitted operational information or not, based on the object which is specified by the higher level information and the object which is registered in the information administrating function. As such, the information inconsistency judgment program according to the present invention can be distributed, and those, who have obtained such a medium, can easily constitute an information inconsistency judgment apparatus, making use of a general electronic computer.

The inconsistency judgment function may be constituted to judge that an inconsistency has occurred in the transmitted operational information, when the object which is specified by the higher-level-information is not registered in the information administrating function.

According to such a constitution, it is judged that an inconsistency has occurred in the transmitted operational information, when the object which is specified by the higher-level-information is not registered in the information administrating function. Thus, it can be easily judged that an inconsistency has occurred in the transmitted operational information, so that an increase of load in the system can be restrained to the utmost.

A sixth solution is constituted by a medium recorded with an information inconsistency correction program in a store-and-forward type of electronic conference system in which operational informations representing operations performed for hierarchical objects are stored and the stored operational informations are batch transmitted between information administrating functions which register and administrate the hierarchical objects, wherein the operational information includes a higher-level-information which specifies an object at the higher level of the treatee object, and the medium is recorded with a program for realizing an inconsistency judgment function for judging as to whether an inconsistency has occurred in the transmitted operational information or not, at the time of treatment of the received operational information, based on the object which is specified by the higher-level-information and the object which is registered in the information administrating function, and an inconsistency correction function for correcting the object which is registered in the information administrating function, based on the transmitted operational information, when the inconsistency judgment function has judged that an inconsistency has occurred in the transmitted operational information.

According to such a constitution, the operational information to be transmitted and received between the information administrating functions includes a higher-level-information which specifies an object at the higher level of the treatee information. Further, the medium is recorded with a program for realizing an inconsistency judgment function for judging as to whether an inconsistency has occurred in the transmitted operational information or not, based on the object which is specified by the higher level information and the object which is registered in the information administrating function and an inconsistency correction function for correcting the object which is registered in the information administrating function, based on the transmitted operational information, when the inconsistency judgment function has judged that an inconsistency has occurred in the transmitted operational information. As such, the information inconsistency correction program according to the present invention can be distributed, and those, who have obtained such a medium, can easily constitute an information inconsistency correction apparatus, making use of a general electronic computer.

The inconsistency judgment function may be constituted to judge that an inconsistency has occurred in the transmitted operational information, when the object which is specified by the higher-level-information is not registered in the information administrating function.

According to such a constitution, it is judged that an inconsistency has occurred in the transmitted information, when the object which is specified by the higher-level-information is not registered in the information administrating function. Thus, it can be easily judged that an inconsistency has occurred in the transmitted operational information, so that an increase of load in the system can be restrained to the utmost.

The operational information may include a transmitter-information specifying the information administrating function which transmitted the operational information itself, and the inconsistency correction function may be constituted to correct the object registered in the information administrating function, by obtaining objects from the information administrating function which is specified by the transmitter-information.

According to such a constitution, the object registered in the information administrating function is corrected by obtaining the hierarchical objects from the information administrating function which is specified by the received transmitter-information. Thus, the inconsistency correction for the transmitted operational information can be easily performed, so that an increase of load in the system can be restrained to the utmost.

Further purposes, advantages and details of the present invention will become more apparent from the following description of the preferred embodiments when read in conjunction with the accompanying drawings.

DETAILED DESCRIPTION OF THE PREFERRED EMBODIMENTS

The present invention will be described in detail hereinafter, with reference to the accompanying drawings.

Figure 1:
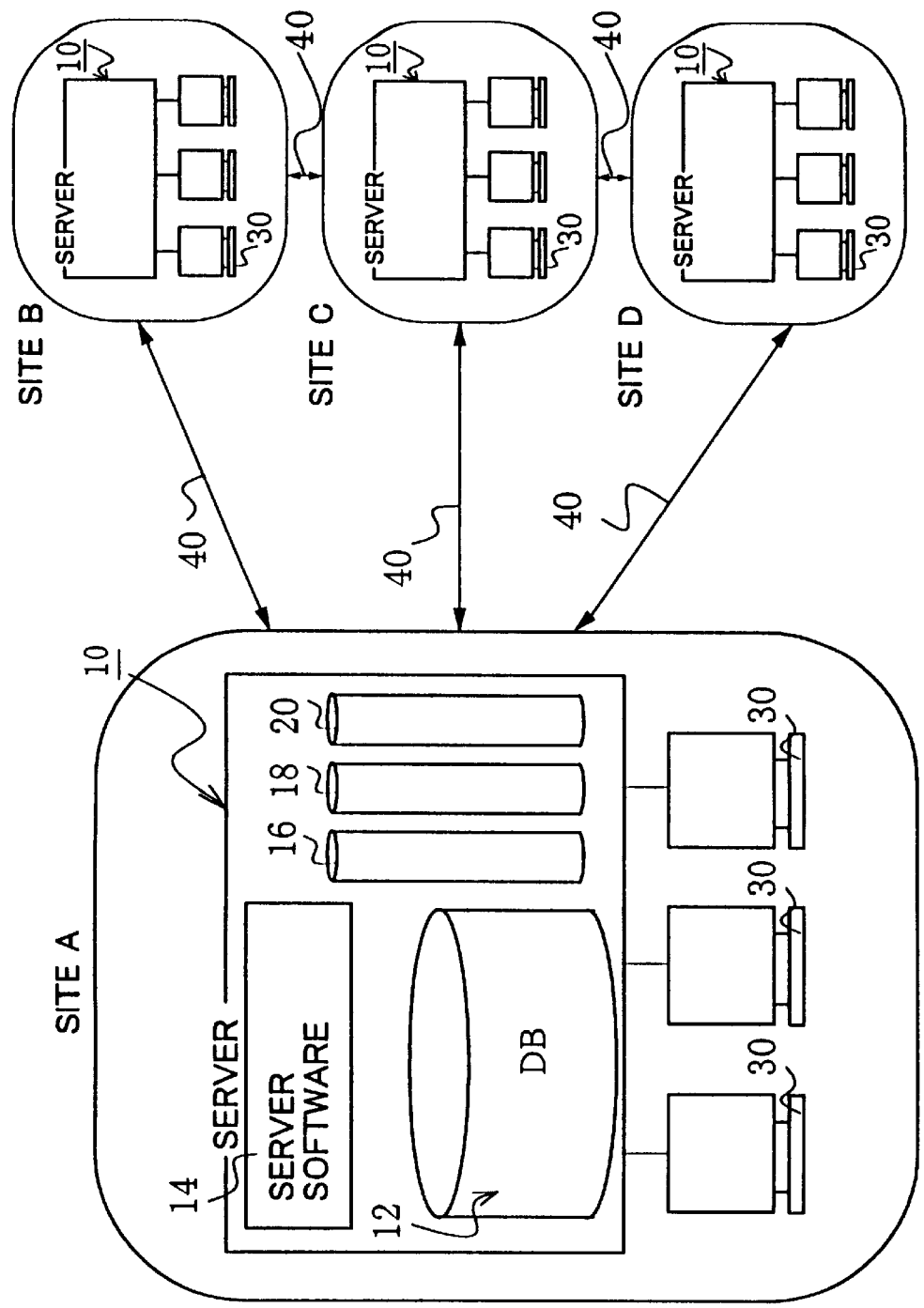
FIG. 1 is a schematic view showing an electronic conference system according to one embodiment of the present invention.

FIG. 1 shows a system architecture in which an electronic conference system according to one embodiment of the present invention is constituted between four sites A, B, C, and D which are geographically separated from one another. Namely, the electronic conference system is attained by a client/server model in which the sites A, B, C and D are connected to one another via communication line. Each of the servers and clients is constituted of an electronic computer which is provided with at least a central processing unit (CPU) and a suitable memory, and executes a program on the memory.

Each of the sites is constituted to include one server 10 (information administrating device, information administrating process, information administrating function), and at least one client 30. The sites are mutually connected via communication lines 40. The information-exchange between the sites are conducted by means of a store-and-forward type of communication system, such as in view of a transmission speed of the communication line 40. Namely, the information occurred at the client 30 of site A is not transmitted upon its occurrence towards sites B, C and D, but stored once for a while in site A and then batch transmitted at each of a predetermined time of period.

Each of the servers 10 is constituted to include a database 12 (information storing device, information storing process, information storing function), a server software 14, a command queue 16, a transmission queue 18, and a reception queue 20. Each server software 14 is adapted for referring to and updating its accompanying database 12. Each command queue 16 stores the operational contents of information occurred within the accompanying site, each transmission queue 18 stores information to be transmitted to other sites, and each reception queue 20 stores information received from other sites. These command queue 16, transmission queue 18 and reception queue 20 are constituted of files which form FIFO (First In First Out) type of queues or waiting lines, respectively.

By means of programs, each server software 14 provides inconsistency judgment device, inconsistency correction device, creation judgment device, inconsistency judgment process, inconsistency correction process, inconsistency judgment function, and inconsistency correction function.

Figure 2:
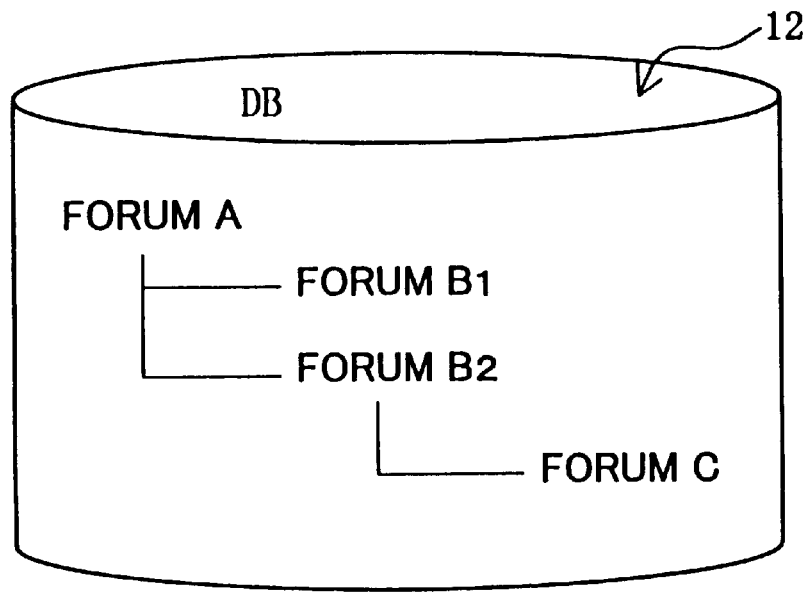
FIG. 2 is an explanatory diagram showing a hierarchy structure of the forums in the system.

Prepared in each database 12 are forums serving as units (containers) for conducting information-exchange. As shown in FIG. 2, forums can be constituted in a hierarchy structure, in which the forum A at the highest level is called "main forum" while each of remaining forums B1, B2, C is called "sub-forum". The sub-forums can be created in a plural manner at the same level. For example, the forum B1 and forum B2 have been created at the same level.

Figure 3:
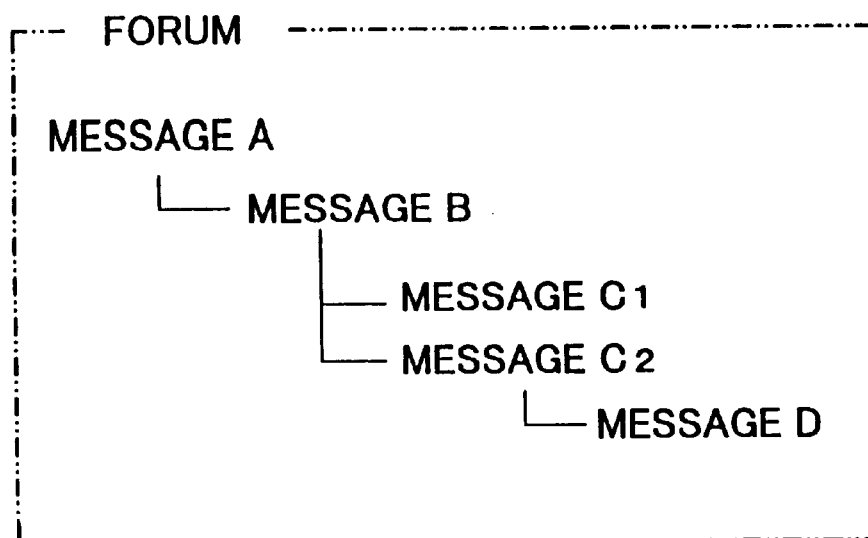
FIG. 3 is an explanatory diagram showing a hierarchy structure of the messages in the system.

As shown in FIG. 3, each of the forums includes messages in a hierarchy structure. The message A at the highest level is called "topic", and has its subject (heading, or title) such as "About . . . ". Each of other messages B, C1, C2 and D are called "reply" which defines a response or answer to a certain message. In this concern, it is possible to assign a plurality of replies to a certain message. In FIG. 3, the replies for the message B are the messages C1 and C2.

Stored in the site, at which the forums are created, are original ones of the forums (original), while the duplications (replica) of the forums are stored in other sites. The users of the forums in the electronic conference system are to perform a working job such as creation of messages for the forum (no matter whether this forum is an original or a replica), to which forum the users belong. The working jobs performed for the forums are transmitted to other sites via communication line 40 by means of the store-and-forward type of communication system, so as to be reflected to the forums of the other sites. As such, there occur time-wise lags between the contents of each sites.

Figure 4:
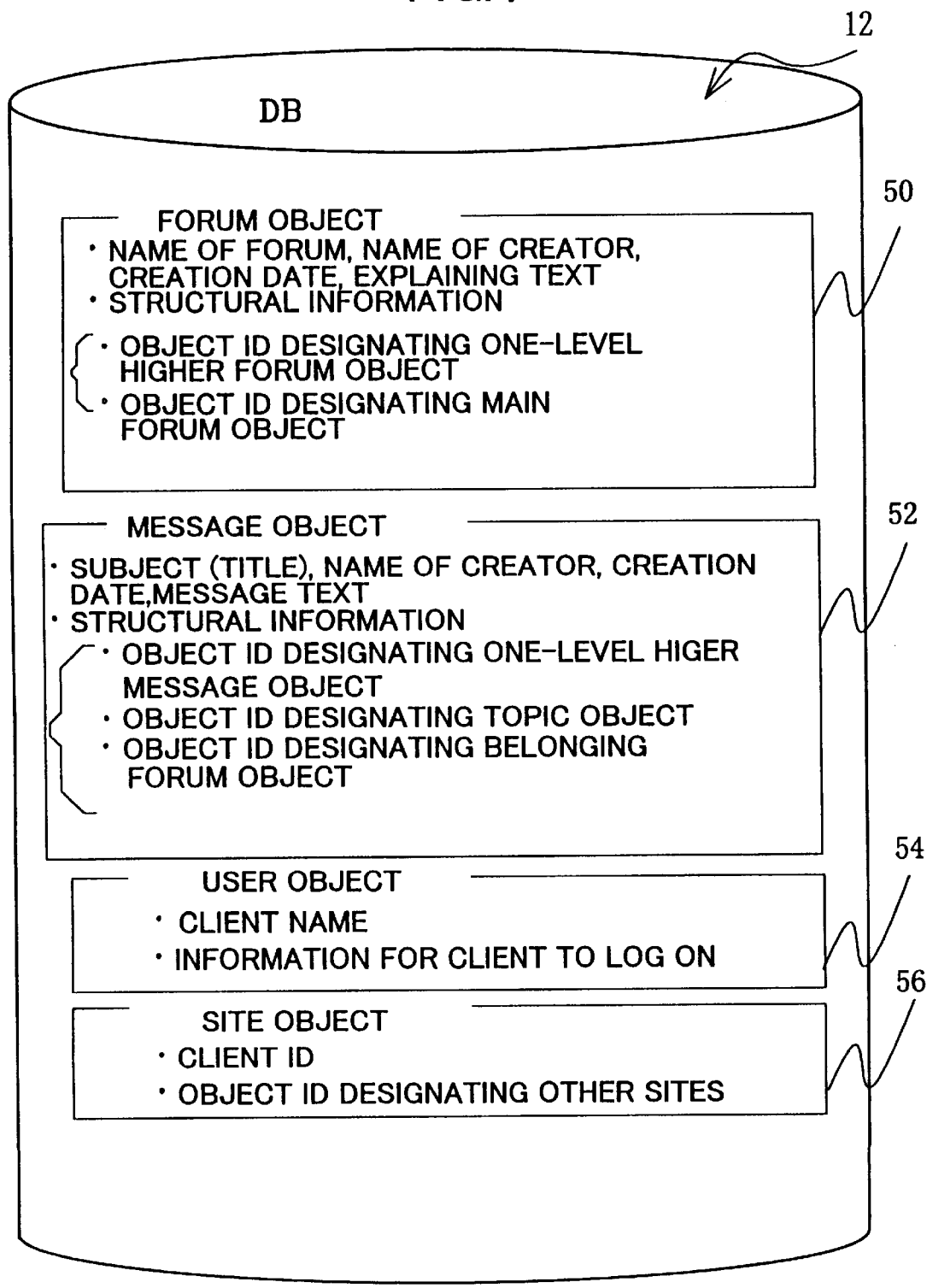
FIG. 4 is an explanatory diagram of the objects registered in a database in the system.
Figure 5:
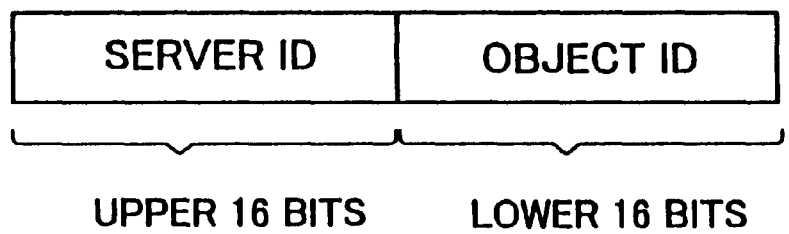
FIG. 5 is an explanatory diagram of an object ID for specifying the object in the system.

For detailed explanation of the contents of database 12, FIG. 4 shows that the database 12 includes a forum object 50, a message object 52, a user object 54 and a site object 56. Each of these objects is assigned with an object ID (identification number) which is unique in the whole of the electronic conference system. Namely, the object ID is determined by a combination of a unique server ID, which is uniquely established in the whole of the electronic conference system, and a unique object ID, which is uniquely assigned to each object in each site. As shown in FIG. 5, such as in case of representing the object ID in a 32-bit manner, there is established a unique ID in the whole of the electronic conference system, by providing upper 16 bits with a server ID, and lower 16 bits with an ID which is uniquely assigned to each objects in each site.

The forum object 50, which defines a forum, contains a name of forum, a name of a person who created this forum, a creation date and an explaining text, as well as a structural information for defining the hierarchy structure of the forum. The structural information includes an object ID and another object ID, representing a one-level higher forum object and the highest-level of forum (main forum) object, respectively.

The message object 52, which defines a message, contains a subject (heading such as "About . . . "), a name of a person who created this message, a creation date and a message text (contents of message), as well as a structural information for defining the hierarchy structure of the message. The structural information includes: an object ID of one-level higher message object which this message 52 is to reply to; another object ID of a topic object which this message 52 belongs to; and a further object ID of a forum object which this message 52 belongs to.

The user object 54, which defines users of the electronic conference system, contains: client names of the clients 30 which are allowed to use the data base 12; and information such as a password for each of the clients 30 to log on. Thus, when a request for referring to the database 12 is issued from the client 30, it can be judged as to whether this client 30 is such as authorized to refer to the database 12 or not, by checking the contents of the user object 54.

The site object 56, which defines a site, contains: client ID's designating those clients 30 which can use the database 12; and object ID's designating other available sites.

Figure 6:
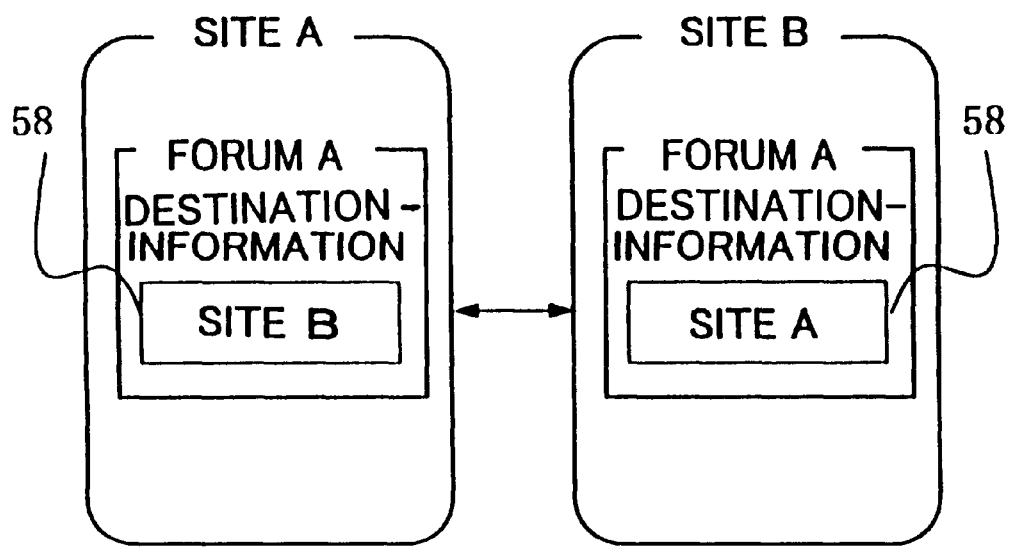
FIG. 6 is an explanatory diagram of destination-informations for specifying the information-exchange-destination, in the system.

Further, each of the forums is registered with a destination-information which defines as to which site the information-exchange is to be conducted with. For example, in case that an information-exchange is to be conducted between the forum A of the site A and the forum A of the site B as shown in FIG. 6, the forum A of site A and the forum A of site B are registered with the site B as the destination-information 58 and the site A as the destinationinformation 58, respectively. Thus, an information occurred at the site A is transmitted, in the example noted just above, to the site B, by referring to the registered destination-information 58 to thereby judge as to which site the information is to be transmitted to.

There will be explained hereinafter the operation of the electronic conference system having such a constitution as described above.

Figure 7:
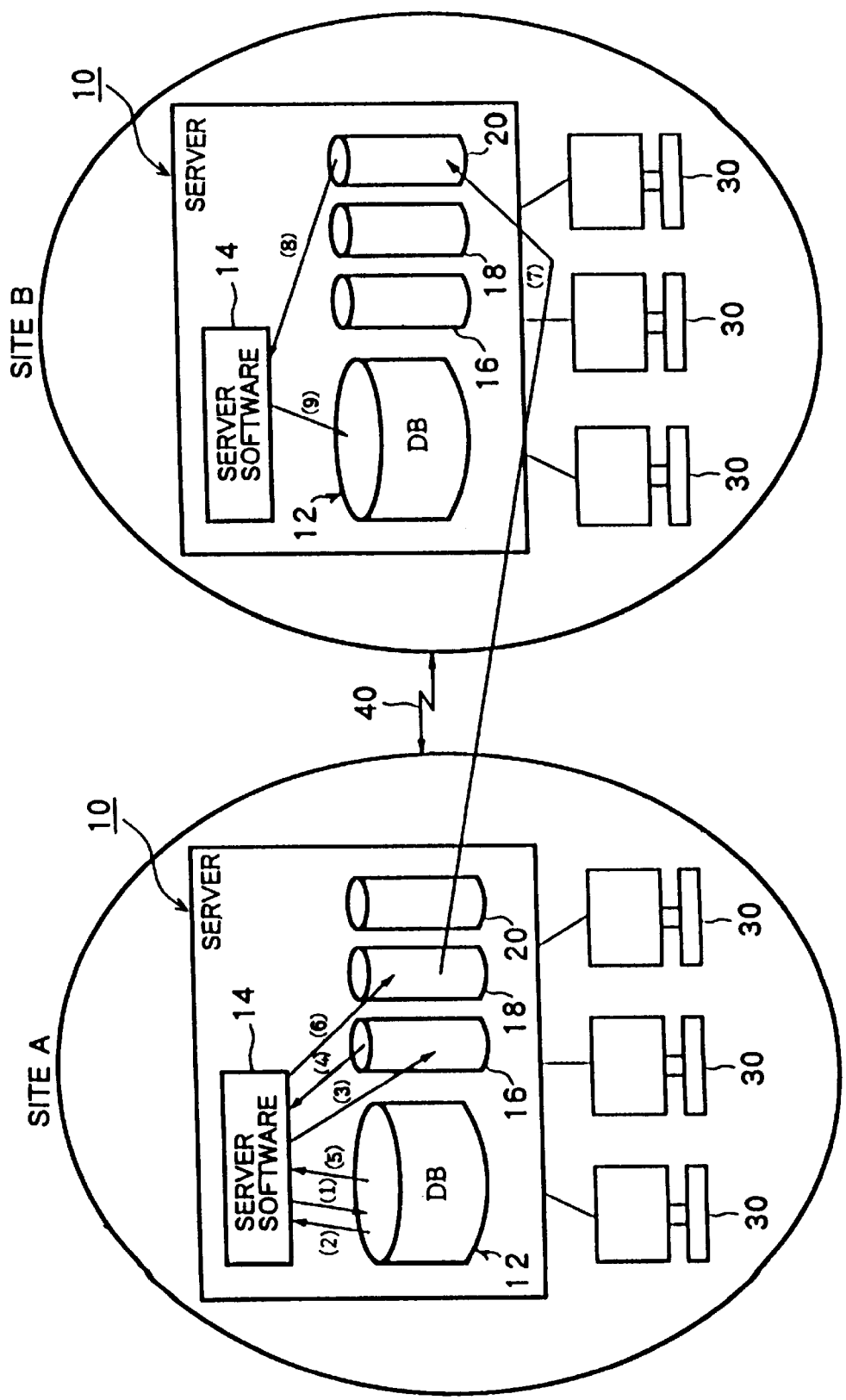
FIG. 7 is a process flow diagram showing a flow of information-exchange in the system.

There is firstly explained an outline of information-exchange to be conducted between the sites, with reference to a process flow diagram of FIG. 7. For expediency of explanation, the information-exchange is supposed to be conducted between the site A and site B, in the electronic conference system shown in FIG. 7.

When the user of the electronic conference system creates, deletes, updates or moves a forum or a message (hereinafter called "object") at the client 30 of the site A, its server software 14 functions to perform a registration processing to its accompanying database 12, correspondingly to the user's working job to the object (processing (1)). At the same time, the server software 14 retrieves from its accompanying database 12 such as an object ID of the object to be worked (processing (2)), creates a command object to be noted later, and registers this command object to the accompanying command queue 16 (processing (3)).

The command object is constituted to contain: a type of operation (such as creation of object); an object ID representing the information transmitter site; an object ID designating a transmittee site as a destination to which the information is to be transmitted; an object ID representing an object to be operated; and an information unique to each operation type. Such as in case of move of objects, the "information unique to each operation" does mean an information representing a move origination and a move destination, while in case of creation of objects, it does mean an information representing a creation position.

The command object registered in the command queue 16 is taken out from this queue 16, by the background which has processing ability to spare in the accompanying server 10 (processing (4)). Then, the body (text sentence, such as in case of message) of object to be processed is retrieved from the accompanying database 12 (processing (5)), if necessary, and thereafter the command object and object body (hereinafter called communicative information) are registered into the transmission queue 18 (processing (6)).

At this time, a "processing for optimizing information" is executed. Namely, this "processing for optimizing information" is a processing to minimize the quantity of information transmission between the sites, by eliminating those command objects registered in the command queue 16 which objects do not have any effects eventually.

The communicative informations registered in the transmission queue 18 are taken out from the queue 18 at each of a predetermined time of period. Then, the site B is determined as a transmittee or destined site based on the command object included in the taken out communicative information, and this communicative information is transmitted to the site B via the communication line 40 (processing (7)). In this concern, the predetermined time of period may be arbitrarily determined by the administrator of the electronic conference system, such that the communicative informations are transmitted during at midnight or early in the morning where the communication line 40 usually has a sufficient time to spare.

At this time, a "processing for assuring sequence" is executed. Namely, this "processing for assuring information sequence" is a processing for avoiding occurrence of such an inconsistency in the sequence of information transmission, that is caused due to the store-and-forward type of communication system.

Meanwhile, the communicative information transmitted from the site A toward the site B is not immediately processed at the site B, but once stored into the reception queue 20 in the site B. The communicative information stored in the reception queue 20 is taken out therefrom at the background of the accompanying server 10 (processing (8)), and a registration processing to the accompanying database 12 is executed correspondingly to the communicative information (processing (9)).

At this time, there are executed such as "judgment processing and correction processing of destination inconsistency", "judgment processing and correction processing of inconsistency in information contents", and "move processing of objects". Namely, the "judgment processing and correction processing of destination inconsistency" are processings for automatically judging and correcting an occurrence of inconsistency in the destination-information 58 registered in the site which has received the communicative information, respectively. The "judgment processing and correction processing of inconsistency in information contents" are processings for automatically judging and correcting an occurrence of inconsistency in the contents of the information registered in the site which has received the communicative information. The "move processing of objects" is a processing for rendering the objects be correctly moved regardless of the sequence of information transmission in case of moving the objects between those forums which have different transmission paths.

Further, in case of occurrence of trouble such as system down due to a certain cause (for example, cut-off of power such as due to power failure) in the server 10 of each site, there is performed an update by a recovery disk for recovering the server 10 to the state just before the occurrence of trouble. The update of recovery disk itself is performed at each site: upon creation, deletion, update, or move of the objects in or to the database 12; or based on the instructions of the system administrator. In case of occurrence of trouble such as system down, the server 10 is recovered to the state just before the occurrence of the trouble, such as by the manual operation of the system administrator and based on the contents of the recovery disk.

The above explained information-exchange is carried out by those processings executed by each of the server software 14.

Shown in FIGS. 8 through 12 are those processings which are executed at each sites, when processing of creation, deletion, update, or move of object is requested from the client 30 to the server 10.

Figure 8:
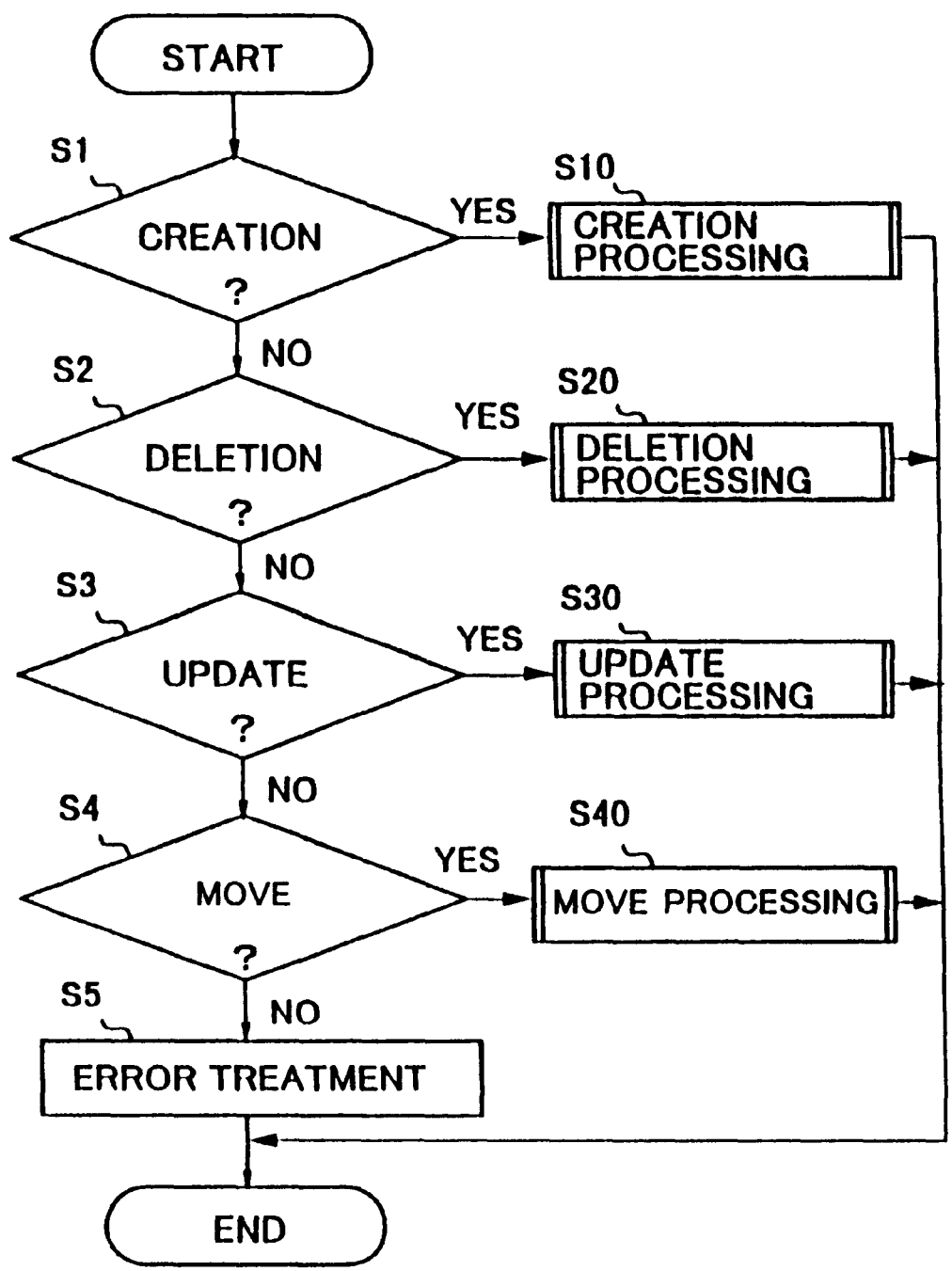
FIG. 8 is a flow chart describing a process for editing objects.

FIG. 8 shows a main routine.

At step 1 (abbreviated as "S1" in the figure, and the same rule is applied to hereinafter), it is judged as to whether the client 30 has requested a processing of object creation, or not. If the processing of object creation has been requested (Yes), the flow branches to step 10 so as to call a sub-routine (see FIG. 9) for performing a creation processing of a due object. The flow branches to step 2, if the processing of object creation has not been requested (No).

At step 2, it is judged as to whether the client 30 has requested a processing of object deletion, or not. If the processing of object deletion is requested (Yes), the flow branches to step 20 so as to call a sub-routine (see FIG. 10) for performing a deletion processing of a due object. The flow branches to step 3, if the processing of object deletion is not requested (No).

At step 3, it is judged as to whether the client 30 has requested a processing of object update, or not. If the processing of object update is requested (Yes), the flow branches to step 30 so as to call a sub-routine (see FIG. 11) for performing an update processing of a due object. The flow branches to step 4, if the processing of object update is not requested (No).

At step 4, it is judged as to whether the client 30 has requested a processing of object move, or not. If the processing of object move is requested (Yes), the flow branches to step 40 so as to call a sub-routine (see FIG. 12) for performing a move processing of a due object. The flow branches to step 5, if the processing of object move is not requested (No).

At step 5, it is judged that the processing request is in error, since the processing request from the client 30 is not anyone of creation, deletion, update, and move of objects. Further, there is effected an error treatment such as for indicating to the operator of client 30 that whose operation is in error.

Figure 9:
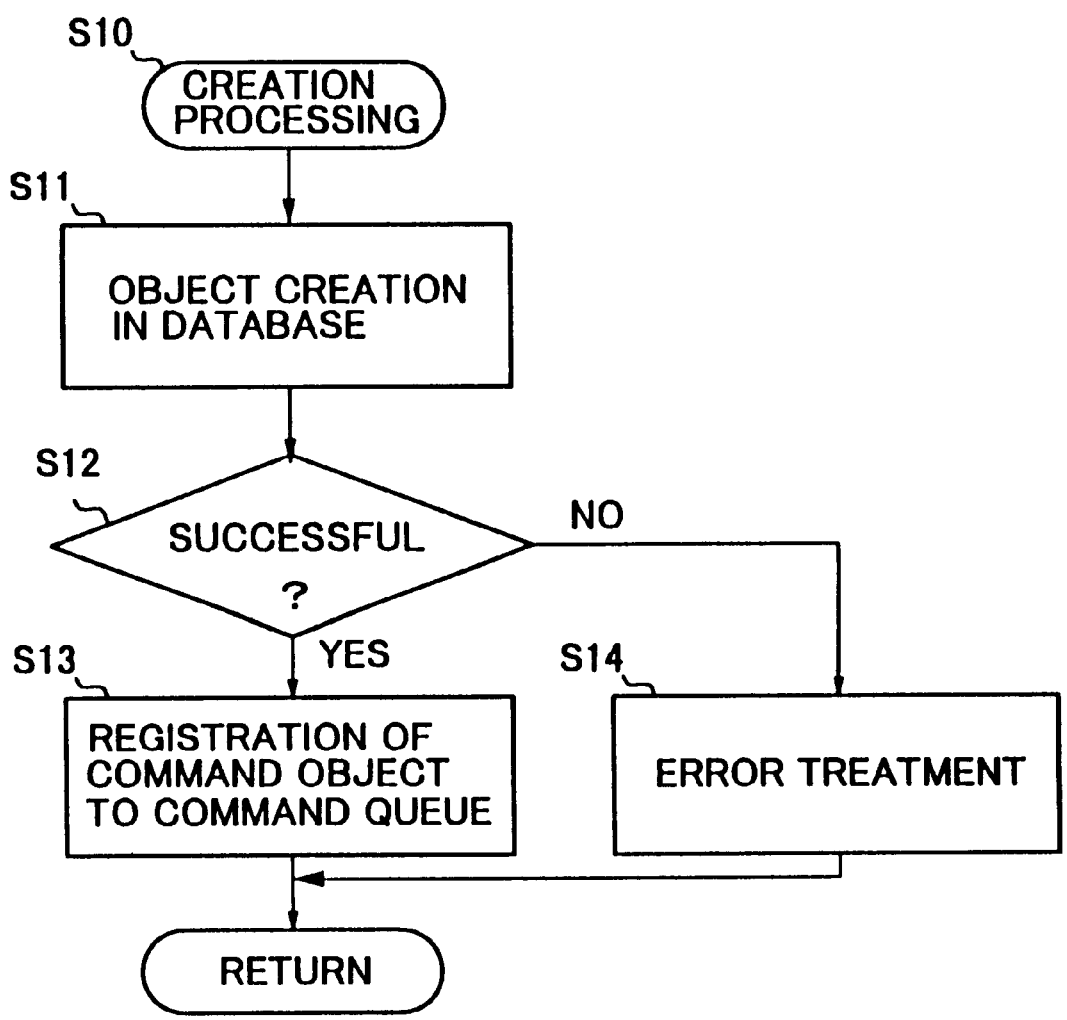
FIG. 9 is a flow chart describing a process for creating objects.

FIG. 9 shows a subroutine for performing the creation processing of the due object.

At step 11, the due object is created in the database 12 at the site which the client 30 belongs to, which client 30 has requested the object creation processing.

At step 12, it is judged as to whether the object creation is successfully performed or not. If the creation is successful, the flow branches to step 13 (Yes). If failed, the flow branches to step 14 (No).

At step 13, there is created a command object which designates an object creation, and this command object is registered to the command queue 16.

At step 14, there is effected an error treatment such as for indicating to the operator of client 30 that the object creation has failed.

Figure 10:
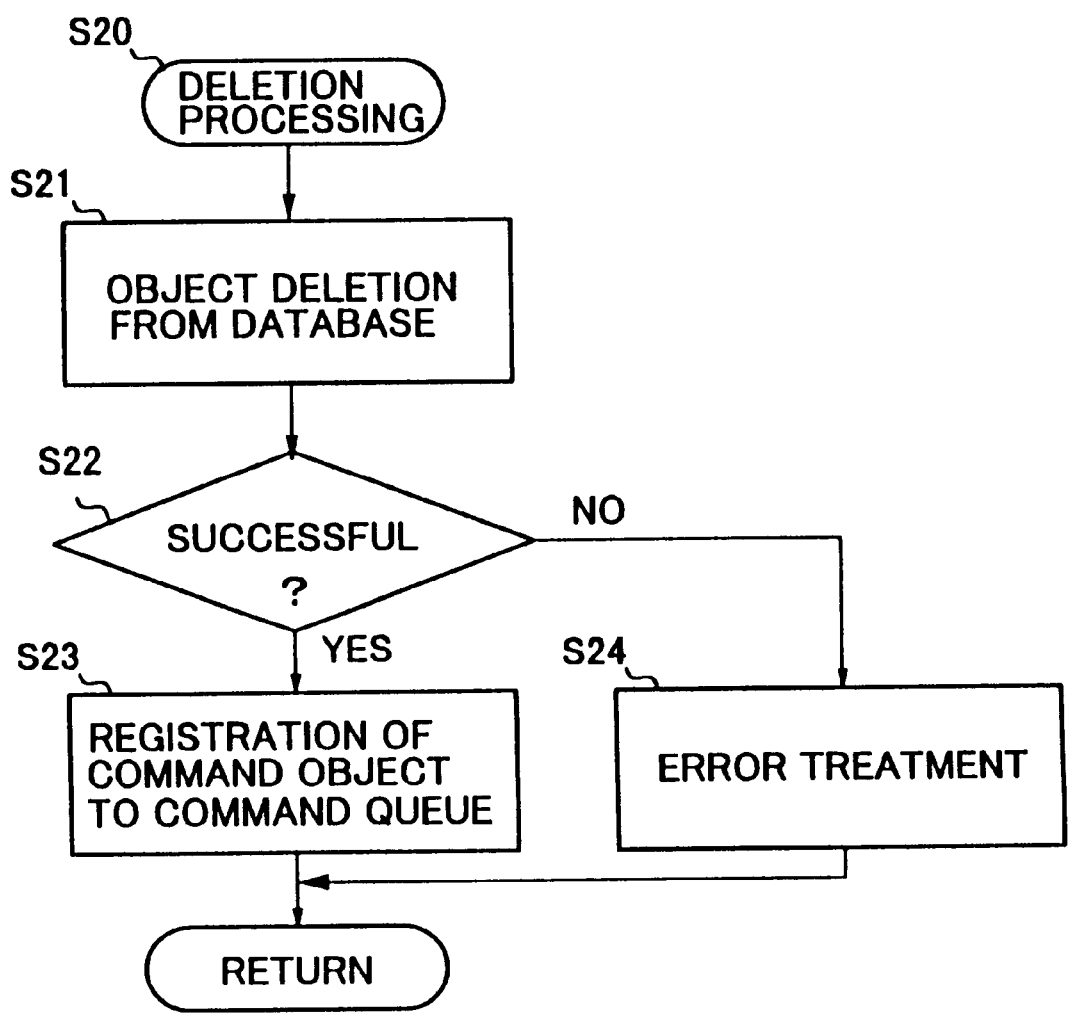
FIG. 10 is a flow chart describing a process for deleting objects.

FIG. 10 shows a subroutine for performing the deletion processing of the due object.

At step 21, the due object is deleted from the database 12 at the site which that client 30 belongs to, which client 30 has requested the object deletion processing.

At step 22, it is judged as to whether the object deletion is successfully performed or not. If the deletion is successful, the flow branches to step 23 (Yes). If failed, the flow branches to step 24 (No).

At step 23, there is created a command object which designates an object deletion, and this command object is registered to the command queue 16.

At step 24, there is effected an error treatment such as for indicating to the operator of client 30 that the object deletion has failed.

Figure 11:
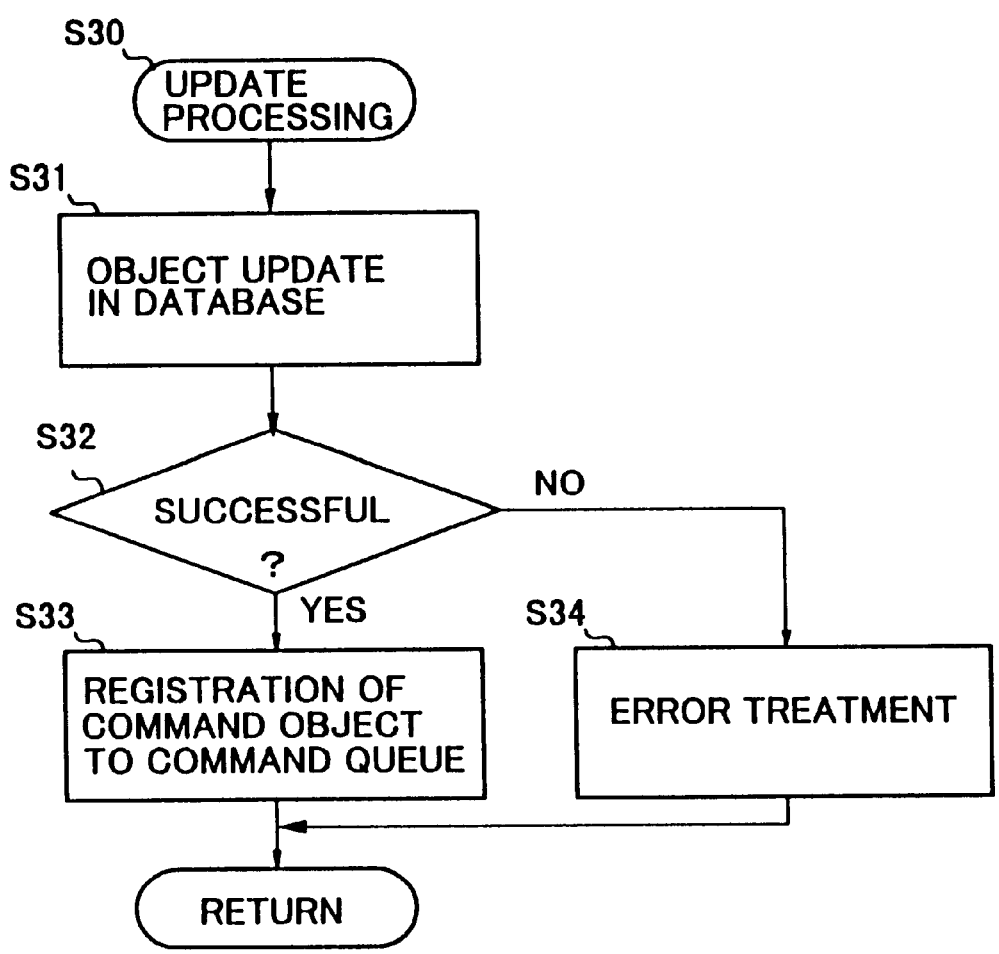
FIG. 11 is a flow chart describing a process for updating objects.

FIG. 11 shows a subroutine for performing the update processing of the due object.

At step 31, the due object is updated in the database 12 at the site which the client 30 belongs to, which client 30 has requested the object update processing.

At step 32, it is judged as to whether the object update is successfully performed or not. If the update is successful, the flow branches to step 33 (Yes). If failed, the flow branches to step 34 (No).

At step 33, there is created a command object which designates an object update, and this command object is registered to the command queue 16.

At step 34, there is effected an error treatment such as for indicating to the operator of client 30 that the object update has failed.

Figure 12:
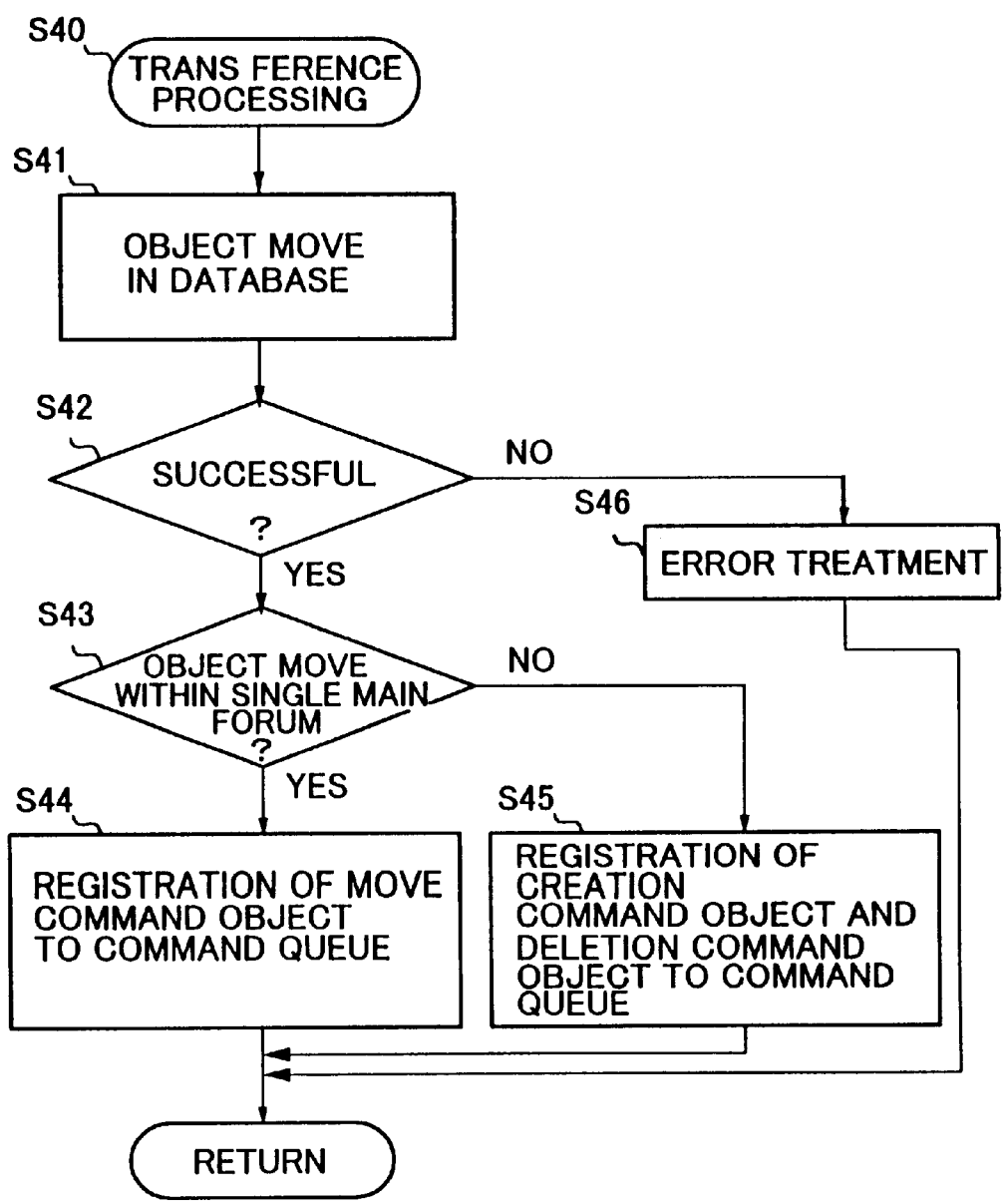
FIG. 12 is a flow chart describing a process for moving objects.

FIG. 12 shows a subroutine for performing the move processing of the due object.

At step 41, the due object in the database 12 is moved at the site which the client 30 belongs to, which client 30 has requested the object move processing.

At step 42, it is judged as to whether the object move is successfully performed or not. If the move is successful, the flow branches to step 43 (Yes). If failed, the flow branches to step 46 (No).

At step 43, it is judged as to whether the object move is to be exclusively performed within a single or sole main forum, or not. If the move is within a single main forum, the flow branches to step 44 (Yes). If not within a single main forum, the flow branches to step 45 (No).

At step 44, there is created a command object which designates an object move, and this command object is registered to the command queue 16. This command object, which designates the object move, is added with an information which represents a move origination and a move destination.

At step 45, there are created command objects which designate an object creation and an object deletion, respectively, and these command objects are registered to the command queue 16. Namely, the object move processing is substituted by an object creation processing and an object deletion processing, so as to avoid such disadvantage to be described later. In this concern, the command object, which designates the object creation, is added with an information designating a creation position of the object, i.e., move destination of the object. The command object, which designates the object deletion, is added with an information designating a deletion position of the object, i.e., move origination of the object.

At step 46, there is effected an error treatment such as for indicating to the operator of client 30 that the object move has failed.

According to the above explained processings of FIGS. 8 through 12, when processing of creation, deletion, update, or move of object is requested from the client 30 to the server 10, the contents of processing request is analyzed to thereby call the subroutine which corresponds to appropriate one of the respective processings. At each of the corresponding subroutines for executing respective processings, there is executed the object processing in a real time manner in the site at which the request of object processing has occurred, while a command object representing each processing contents is substantially concurrently registered into the command queue 16.

Figure 13:
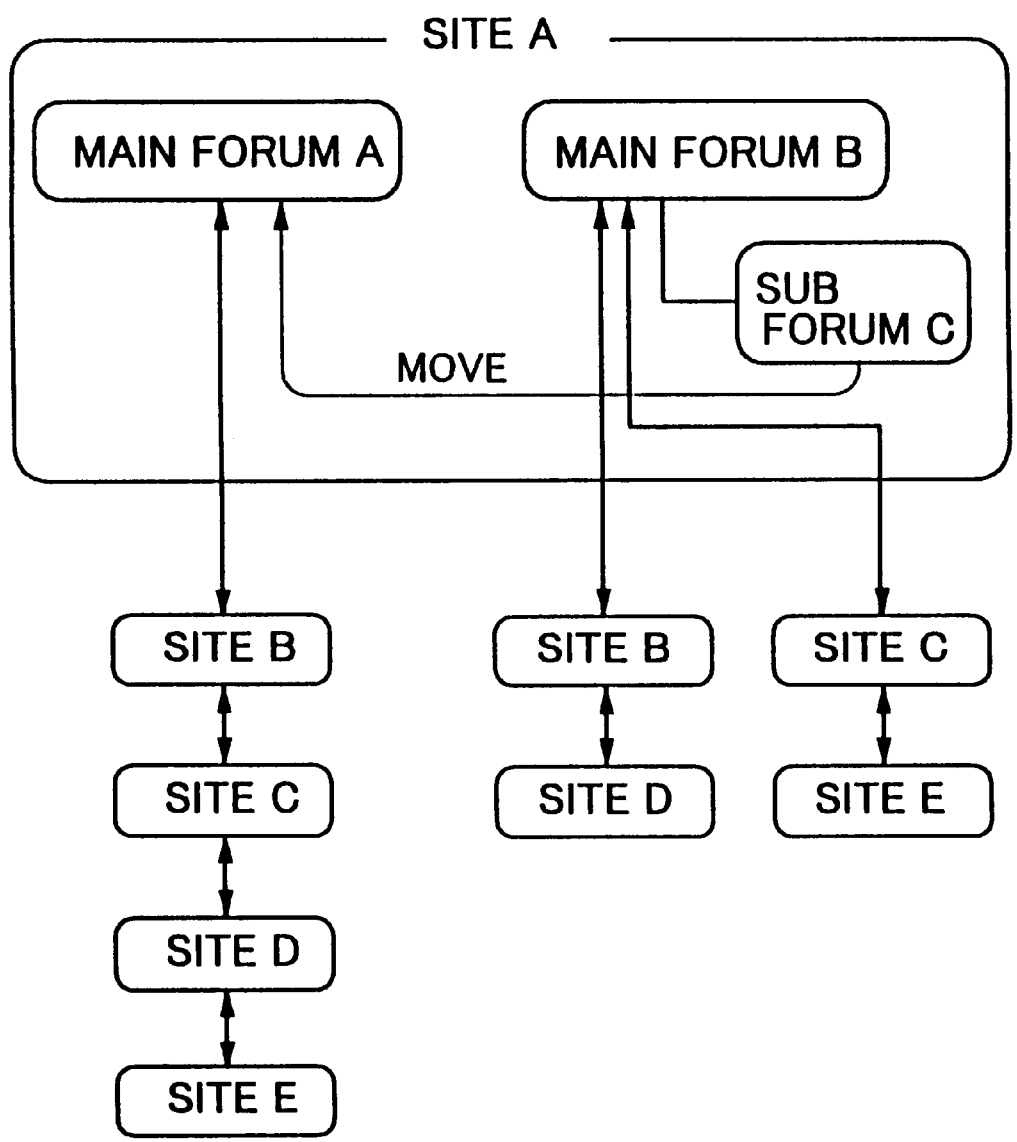
FIG. 13 is an explanatory diagram showing a necessity of the process for moving objects.

The reason why the move processing is performed in such a manner shown in FIG. 12, is as follows:

As shown in FIG. 13, it is now supposed that a main forum A and a main forum B have been established in the site A, and a sub-forum C has been established at the lower level of the main forum B. In addition, an information transmission path for the main forum A of site A is supposed to be established, so that the information is linearly transmitted to sites B, C, D and E. Further, it is supposed that, for the main forum B of site A, an information transmission path is established to a site D via site B, and another information transmission path is established to a site E via site C.

It is now assumed that the sub-forum C is moved to a lower level of the main forum A. This move of sub-forum C to the lower level of the main forum A does mean a creation of a sub-forum C for the main forum A. Contrary, this is nothing other than deletion of sub-forum C for the main forum B. Then arises such a situation that the site D is transmitted with both informations, i.e., a creation of sub-forum C by an information via the information transmission path originated from the main forum A, and a deletion of sub-forum C by another information via the information transmission path originated from the main forum B.

However, the site D is not necessarily transmitted with these informations, in the order or sequence of "deletion and creation" of the subforum C. As such, if the site D is transmitted with these informations in the order of "creation and deletion" of the sub-forum C, the result is that the subforum C does not exist in the site D. Due to this reason, it is not always possible to regard a move of object between forums having different information transmission paths, as being a move of object. Thus, it is necessary to perform different processings depending on as to whether the move is to be performed within a single main forum or not.

Shown in FIGS. 14 through 18 are those processings which are executed at each site, when the command objects are taken out from the command queue 16 at the background of the server 10, and registered to the transmission queue 18. These processings shown in FIGS. 14 through 18 are the aforementioned information optimization processing.

Figure 14:
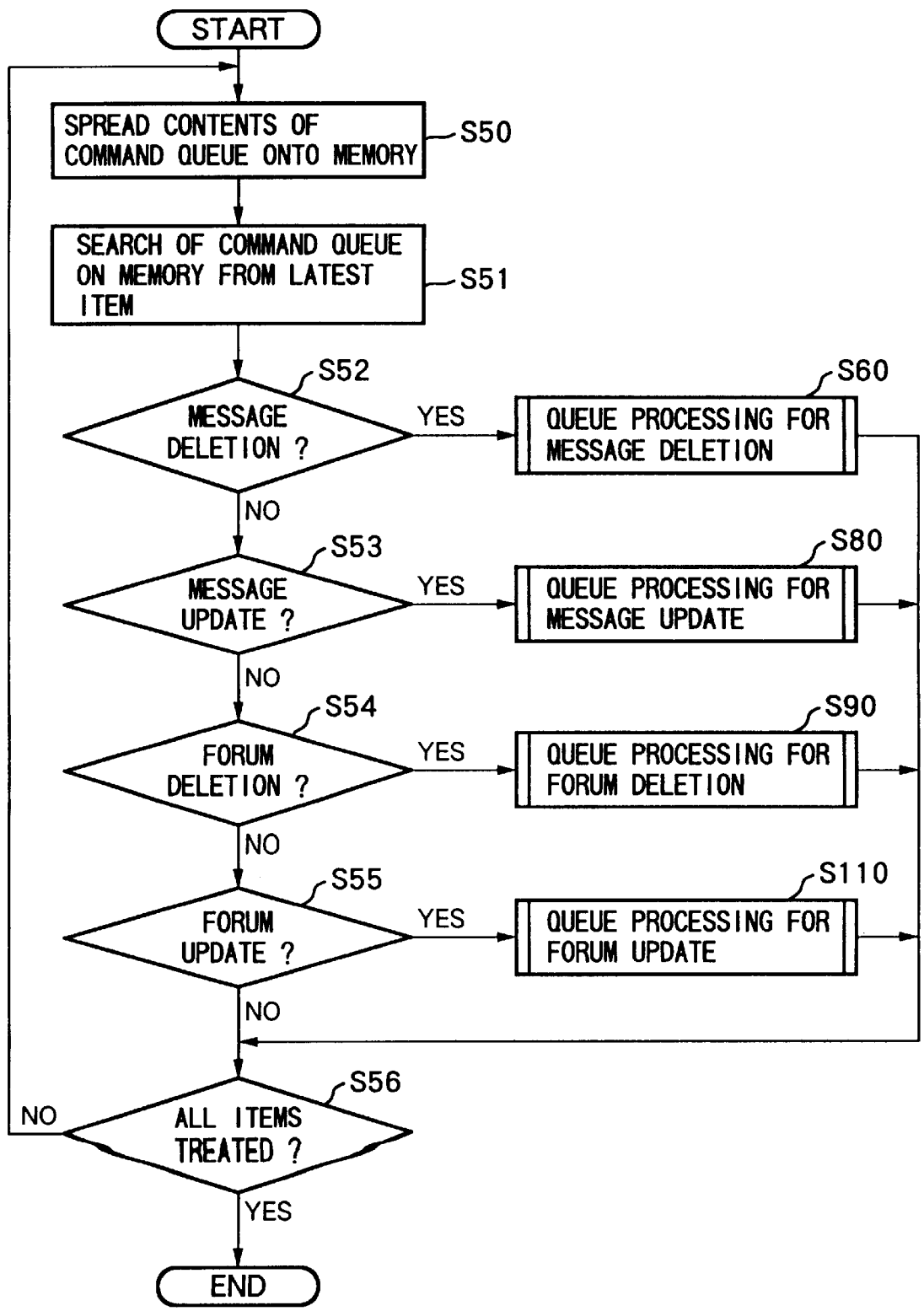
FIG. 14 is a flow chart showing a process for optimizing the information.

FIG. 14 shows a main routine of the information optimization processing.

At step 50, the command objects registered in the command queue 16 are readout to be spread on the memory. Namely, there is created a duplication of command queue 16 onto the memory.

At step 51, a searching is started from the latest item ("item" means the "command object", and the same rule is applied to hereinafter) in the command queue spread onto the memory (hereinafter called "command queue on the memory"). Namely, the latest item is considered in the first processing loop, and the remaining items are considered one after another in the processing loops after the second loop inclusive, in a retroacting manner, or in the older direction or sequence.

At step 52, it is judged as to whether the currently considering item is a command object designating a message deletion, or not. Such a judgment (as well as the judgment on an update of message, a deletion or update of forum, to be explained later) is performed by checking the type of operation included in the command object. If it is a deletion of message, the flow branches to step 60 (Yes) to call a subroutine (FIG. 15) for performing a queue processing for message deletion. Contrary, if it is not a deletion of message, the flow branches to step 53 (No).

At step 53, it is judged as to whether the currently considering item is a command object designating a message update, or not. If it is an update of message, the flow branches to step 80 (Yes) to call a subroutine (FIG. 16) for performing a queue processing for message update.

Contrary, if it is not an update of message, the flow branches to step 54 (No).

At step 54, it is judged as to whether the currently considering item is a command object designating a forum deletion, or not. If it is a deletion of forum, the flow branches to step 90 (Yes) to call a subroutine (FIG. 17) for performing a queue processing for forum deletion. Contrary, if it is not a deletion of forum, the flow branches to step 55 (No).

At step 55, it is judged as to whether the currently considering item is a command object designating a forum update, or not. If it is an update of forum, the flow branches to step 110 (Yes) to call a subroutine (FIG. 18) for performing a queue processing for forum update. Contrary, if it is not an update of forum, the flow branches to step 56 (No).

At step 56, it is judged as to whether all items included in the command queue on the memory have been treated, or not. If all items have been treated, this routine is terminated (Yes). If all items have not been treated, the flow goes back to step 50 (No).

Figure 15:
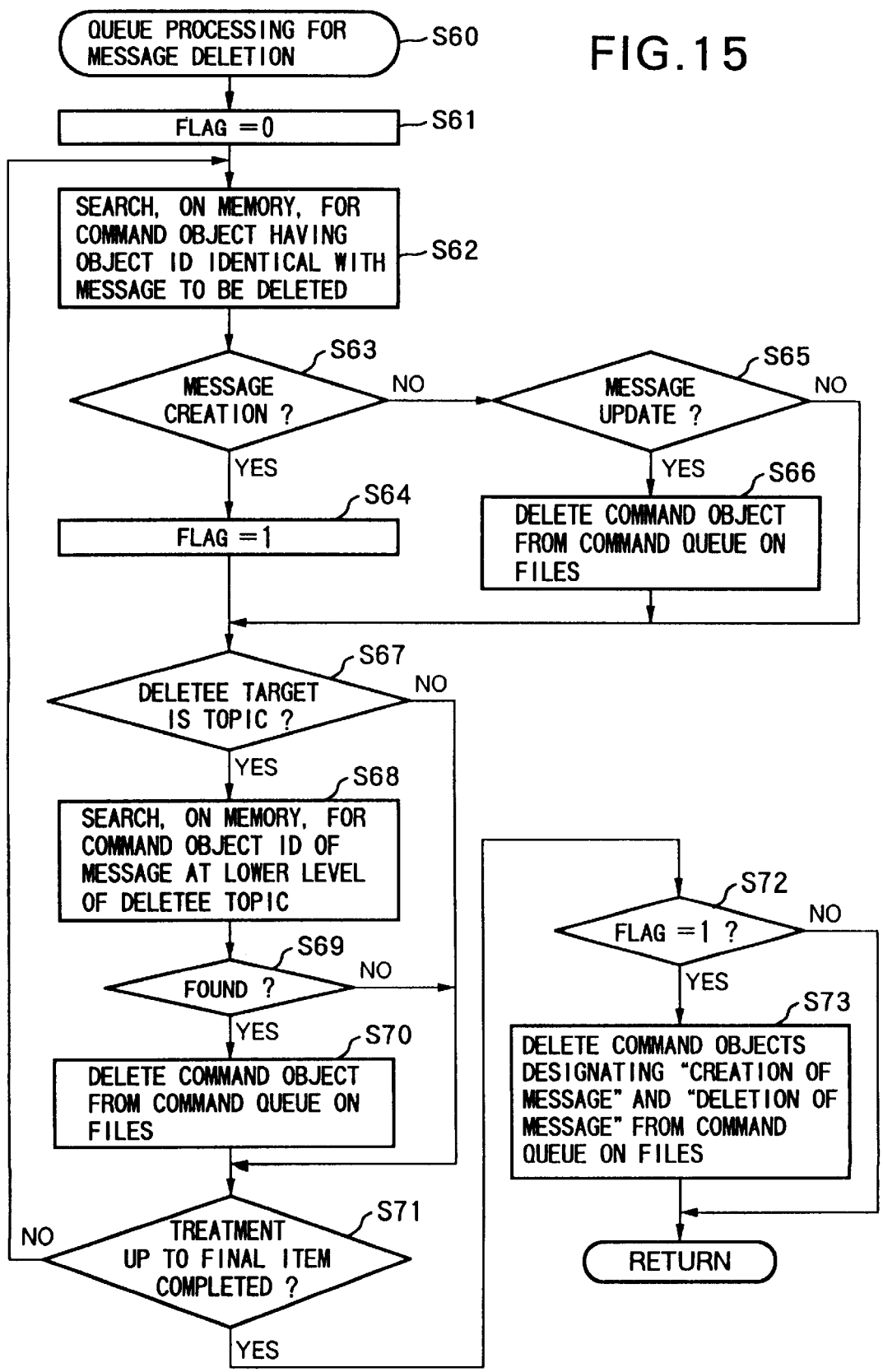
FIG. 15 is a flow chart showing a deletion process of a message on a queue.

FIG. 15 shows a subroutine for performing a command object processing according to message deletion to be executed in the processing for optimizing information.

At step 61, there is executed an initialization for setting a flag to "0". This flag indicates as to whether the command queue on the memory is registered with a command object designating a message creation, or not.

At step 62, from the item next to the item which relates to the message to be deleted, there is searched for an item having an object ID identical with that of the message to be deleted. Namely, the item next to the item related to the deletee message (i.e., message to be deleted) is considered in the first processing loop, and the remaining items are considered one after another in the processing loops after the second loop inclusive, in a retroacting manner.

At step 63, it is judged as to whether the currently considering item is a command object designating a creation of the message, or not. If it is such a message creation, the flow branches to step 64 (Yes) to set the flag to "1". If it is not such a message creation, the flow branches to step 65 (No).

At step 65, it is judged as to whether the currently considering item is a command object designating an update of the same message, or not. If it is such a message update, the flow branches to step 66 (Yes) to eliminate, from the command queue 16 on the files, a command object designating the message update. If it is not such a message update, the flow branches to step 67 (No).

At step 67, it is judged as to whether the deletee message is a topic or not. Such a judgment can be effected by checking as to whether, the object ID designating an operatee target which is included in the command object, is identical with the object ID designating a topic object, which is included in the message object. The flow branches to step 68 (Yes) if the deletee target is a topic, or to step 71 if the deletee target is not a topic (No).

At step 68, there are searched for command objects relating to a message (i.e., "reply") at the lower level of the deletee "topic", in the command queue on the memory.

At step 69, it is judged as to whether a command object relating to a message at the lower level of topic has been found or not. If the command object relating to such a message is found, the flow branches to step 70 (Yes) to eliminate this command object relating to such a message, from the command queue 16 on the files. If a command object relating to such a message is not found, the flow branches to step 71 (No).

At step 71, it is judged as to whether a treatment up to the final item, i.e., the oldest item in the command queue on the memory, has been completed or not. The flow branches to step 72 (Yes) if the final item has been treated, but branchingly goes back to the step 62 if the final item has not been treated (No).

At step 72, it is judged as to whether the flag is "1" or not, i.e., whether a command object designating a creation of the message existed in the command queue on the memory or not. If the flag is "1", the flow branches to step 73 (Yes), to eliminate the command objects designating message creation and deletion, respectively, from the command queue 16 on the files. If the flag is "0" (No), this routine is terminated.

According to those processings at steps 61 through 73 as explained above, if the command queue 16 on the files includes a command object designating a message deletion, it can be decided that no affects are eventually made by an update processing for the message to be executed before deletion of the message. Thus, by eliminating, from the command queue 16 on the files, those command objects designating such message update, the information quantity to be transmitted toward other sites is reduced. Contrary, if any command objects designating message creation are not found in the command queue 16, it can be decided that a creation of the message at issue has been already performed. In this case, it is not performed to eliminate from the command queue 16 a command object designating a message deletion, to thereby avoid disadvantage. Further, in case that the deletee message is a topic, there are eliminated all of the command objects related to those messages (replies) at the lower levels of the topic, so that the information quantity to be transmitted toward other sites is further reduced.

Figure 16:
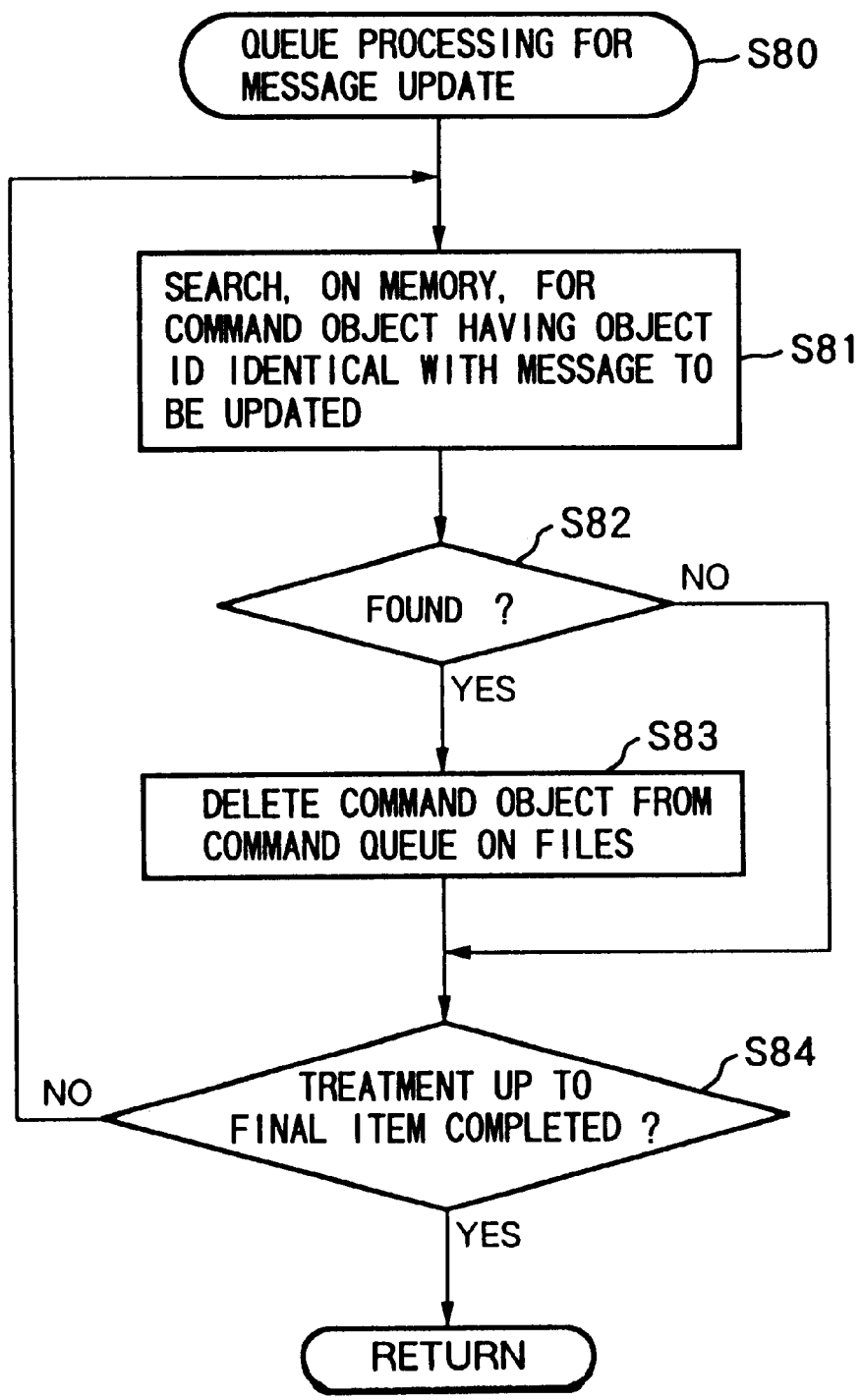
FIG. 16 is a flow chart showing a update process of a message on a queue.

FIG. 16 shows a subroutine for performing a queue processing according to message update to be executed in the processing for optimizing information.

At step 81, in the command queue on the memory, from the item next to the item which relates to the message to be updated, there are searched for those items, each of which has an object ID identical with that of the message to be updated, and which designates a message update. Namely, the item next to the item related to the updatee message is considered in the first processing loop, and the remaining items are considered one after another in the processing loops after the second loop inclusive, in a retroacting manner.

At step 82, it is judged as to whether a command object designating an update of the message has been found or not. If the command object designating the message update is found, the flow branches to step 83 (Yes) to eliminate this command object designating the message update, from the command queue 16 on the files. If a command object designating such a message update is not found, the flow branches to step 84 (No).

At step 84, it is judged as to whether a treatment up to the final item, i.e., the oldest item in the command queue on the memory has been completed or not. This routine is terminated (Yes) if the final item has been treated, but the flow branchingly goes back to the step 81 if the final item has not been treated (No).

According to those processings at steps 81 through 84 as explained above, except for the latest command object designating a message update, the remaining command objects designating the update of the same message are eliminated from the command queue 16 on the files. Namely, even if a plurality of processings for updating a certain message have been performed, the pertinent forum can be updated to the latest contents by the latest command object only. As such, by eliminating those command objects from the command queue 16 which objects do not have any effects eventually, the quantity of information to be transmitted to other sites can be reduced.

Figure 17:
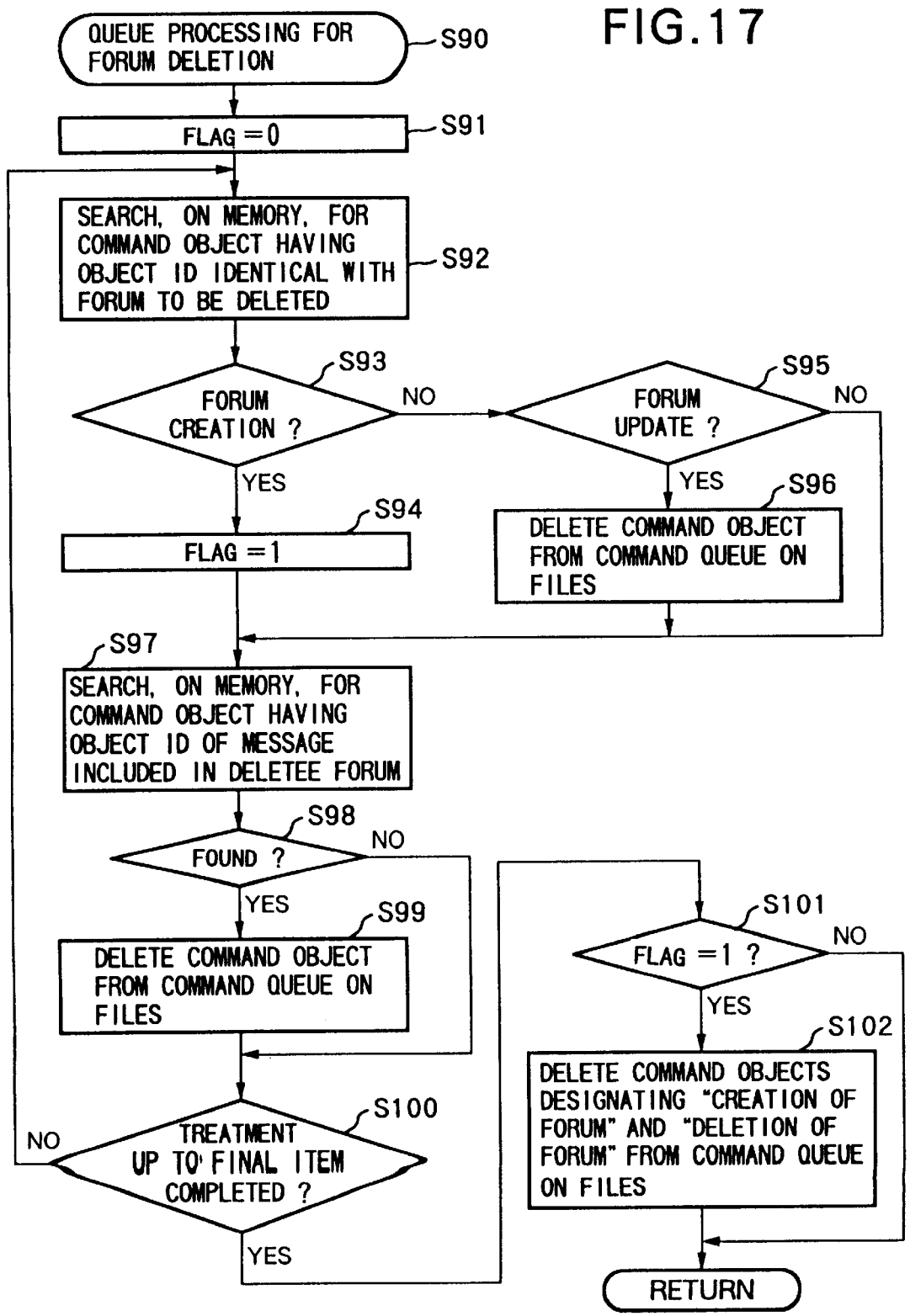
FIG. 17 is a flow chart showing a deletion process of a forum on a queue.

FIG. 17 shows a subroutine for performing a command object processing according to forum deletion to be executed in the processing for optimizing information.

At step 91, there is executed an initialization for setting a flag to "0". This flag indicates as to whether the command queue on the memory is registered with a command object designating a forum creation, or not.

At step 92, in the command queue on the memory, from the item next to the item which relates to the forum to be deleted, there is searched for an item having an object ID identical with that of the forum to be deleted. Namely, the item next to the item related to the deletee forum is considered in the first processing loop, and the remaining items are considered one after another in the processing loops after the second loop inclusive, in a retroacting manner.

At step 93, it is judged as to whether the currently considering item is a command object designating a creation of the forum, or not. If it is such a forum creation, the flow branches to step 94 (Yes) to set the flag to "1". If it is not such a forum creation, the flow branches to step 95 (No).

At step 95, it is judged as to whether the currently considering item is a command object designating an update of the forum, or not. If it is such a forum update, the flow branches to step 96 (Yes) to eliminate, from the command queue 16 on the files, a command object designating the forum update. If it is not such a forum update, the flow branches to step 97 (No).

At step 97, there is searched for a command object relating to a message included in the deletee forum, in the command queue on the memory.

At step 98, it is judged as to whether a command object relating to a message included in the deletee forum has been found or not. If the command object relating to the message included in the deletee forum is found, the flow branches to step 99 (Yes) to eliminate this command object relating to the message, from the command queue 16 on the files. If a command object relating to the message is not found, the flow branches to step 100 (No).

At step 100, it is judged as to whether a treatment up to the final item, i.e., the oldest item in the command queue on the memory has been treated or not. The flow branches to step 101 (Yes) if the final item has been treated, but branchingly goes back to the step 92 if the final item has not been treated (No).

At step 101, it is judged as to whether the flag is "1" or not, i.e., whether a command object designating a creation of the forum existed in the command queue on the memory or not. If the flag is "1", the flow branches to step 102 (Yes), to eliminate the command objects designating forum creation and deletion, respectively, from the command queue 16 on the files. If the flag is "0" (No), this routine is terminated.

According to those processings at steps 91 through 102 as explained above, if the command queue 16 on the files includes a command object designating a forum deletion, it can be decided that no affects are eventually made by an update processing of the forum to be executed before deletion of the forum. Thus, by eliminating, from the command queue 16 on the files, those command objects designating such forum update, the information quantity to be transmitted toward other sites is reduced. Contrary, if any command objects designating creation of the forum are not found in the command queue 16, it can be decided that a creation of the forum at issue has been already performed. In this case, it is not performed to eliminate from the command queue 16 a command object designating a forum deletion, to thereby avoid disadvantage. Further, a deletion of forum does mean a deletion of those messages included in this deletee forum. Thus, by eliminating command objects related to such messages, the information quantity to be transmitted toward other sites is further reduced.

Figure 18:
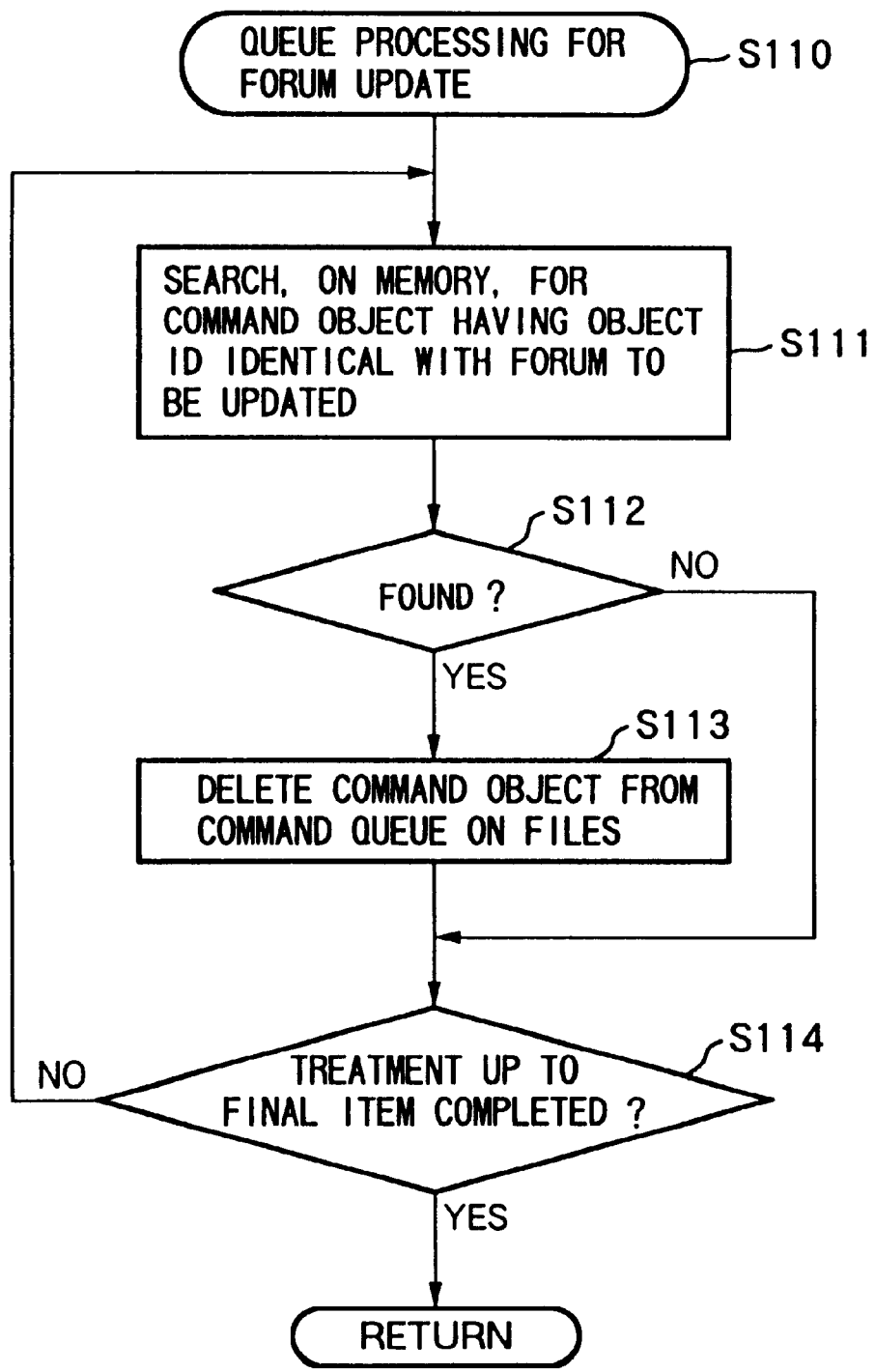
FIG. 18 is a flow chart showing a update process of a forum on a queue.

FIG. 18 shows a subroutine for performing a queue processing according to forum update to be executed in the processing for optimizing information.

At step 111, in the command queue on the memory, from the item next to the item which relates to the forum to be updated, there is searched for an item, which has an object ID identical with that of the forum to be updated, and which designates an update of the forum. Namely, the item next to the item related to the updatee forum is considered in the first processing loop, and the remaining items are considered one after another in the processing loops after the second loop inclusive, in a retroacting manner.

At step 112, it is judged as to whether a command object designating such a forum update has been found or not. If the command object designating the forum update is found, the flow branches to step 113 (Yes) to eliminate this command object designating the forum update, from the command queue 16 on the files. If a command object designating such a forum update is not found, the flow branches to step 114 (No).

At step 114, it is judged as to whether a treatment up to the final item, i.e., the oldest item in the command queue on the memory has been completed or not. This routine is terminated (Yes) if the final item has been treated, but the flow branchingly goes back to the step 111 if the final item has not been treated (No).

According to those processings at steps 111 through 11 4 as explained above, except for the latest command object designating a forum update, the remaining command objects designating the update of the forum are eliminated from the command queue 16 on the files. Namely, even if a plurality of processings for updating a certain forum have been performed, the pertinent forum can be updated to the latest contents by the latest command object only. As such, by eliminating those command objects from the command queue 16 which objects do not have any effects eventually, the quantity of information to be transmitted to other sites can be reduced.

Thus, according to the processing for optimizing information shown in FIGS. 14 through 18, the quantity of information to be transmitted to other sites can be remarkably reduced without any disadvantage concerning information transmission, resulting in a drastic improvement in transmission efficiency.

Figure 19:
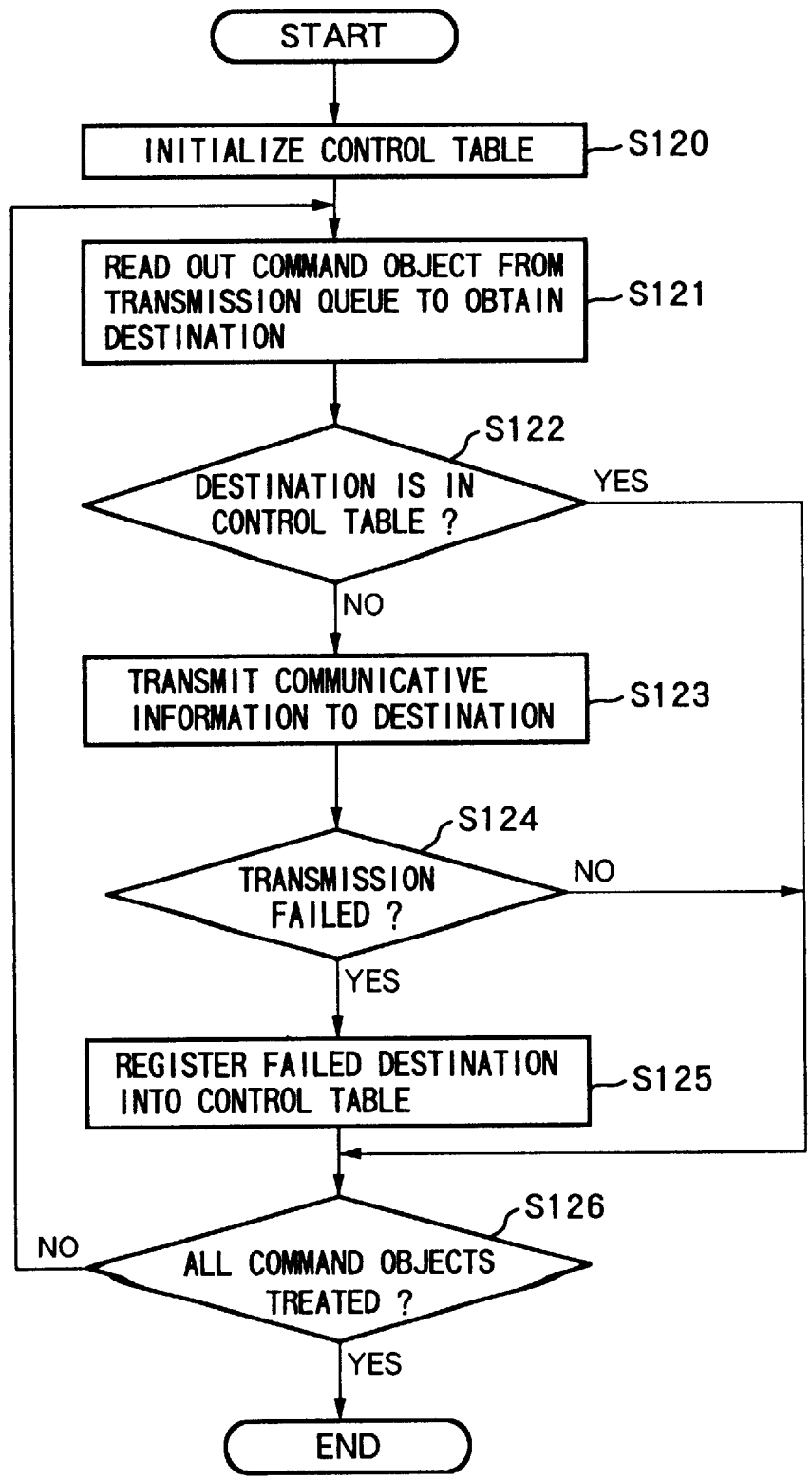
FIG. 19 is a flow chart showing a process for assuring information sequence.

FIG. 19 shows a processing for assuring an information sequence, to be executed when the communicative information is taken out and transmitted in each of the sites.

At step 120, there is initialized a control table. Namely, the control table is registered with those sites which the information could not be transmitted to, such as due to trouble of the communication line 40 at the time of transmission.

At step 121, one of the command objects is read out from the transmission queue 18, to obtain a transmittee-destination for specifying a destination. Concerning this reading out of command objects, the latest item is read out in the first processing loop, and the remaining items are read out one after another in the processing loops after the second loop inclusive, in a retroacting manner, or in the older direction or sequence.

At step 122, it is judged as to whether the obtained destination is registered in the control table or not. The flow branches to step 126 (Yes) if the destination is registered in the control table, and to step 123 (No) if the destination is not registered in the control table.

At step 123, the communicative information is transmitted via communication line 40 toward the destination obtained from the command object.

At step 124, it is judged as to whether the transmission has failed or not. If the transmission has failed, the flow branches to step 125 (Yes) to register the failed destination into the control table. Contrary, the flow branches to step 126 (No), if the transmission has succeeded. It is noted that the communicative information of failed transmission is not deleted from the transmission queue 18, and its transmission is tried again in the next processing.

At step 126, it is judged as to whether all of the command objects in the transmission queue 18 have been treated or not. This routine is terminated if all of the command objects have been treated (Yes), but the flow branchingly goes back to step 121 if all of the command objects have not been treated (No).

According to the above explained processing of steps 120 through 126, there are registered those destinations, the communicative information transmission to which have failed, into the control table. Further, for those destinations to which the transmissions have failed, the communicative informations are not transmitted and not deleted from the transmission queue 18. Thus, even in case that the communicative information has not been transmitted such as due to trouble of the communication line 40, the sequence of informations is assured, to avoid occurrence of disadvantage. As an additional effect, no transmissions are performed during the current transmission processing, toward those destinations in which communication errors have occurred. Thus, useless transmissions can be omitted, attaining reduction in occupancy time of the communication line 40. Those communicative informations, which have not been transmitted during the current processing, are tried to be transmitted in the next processing after lapse of a predetermined time of period. This is because, such as trouble of the communication line 40 may be recovered by the lapse of the predetermined time of period.

FIGS. 20 through 23 show those processings which are executed when one of the communicative informations is taken out from the reception queue 20 at the background of the server 10 at each site.

Figure 20:
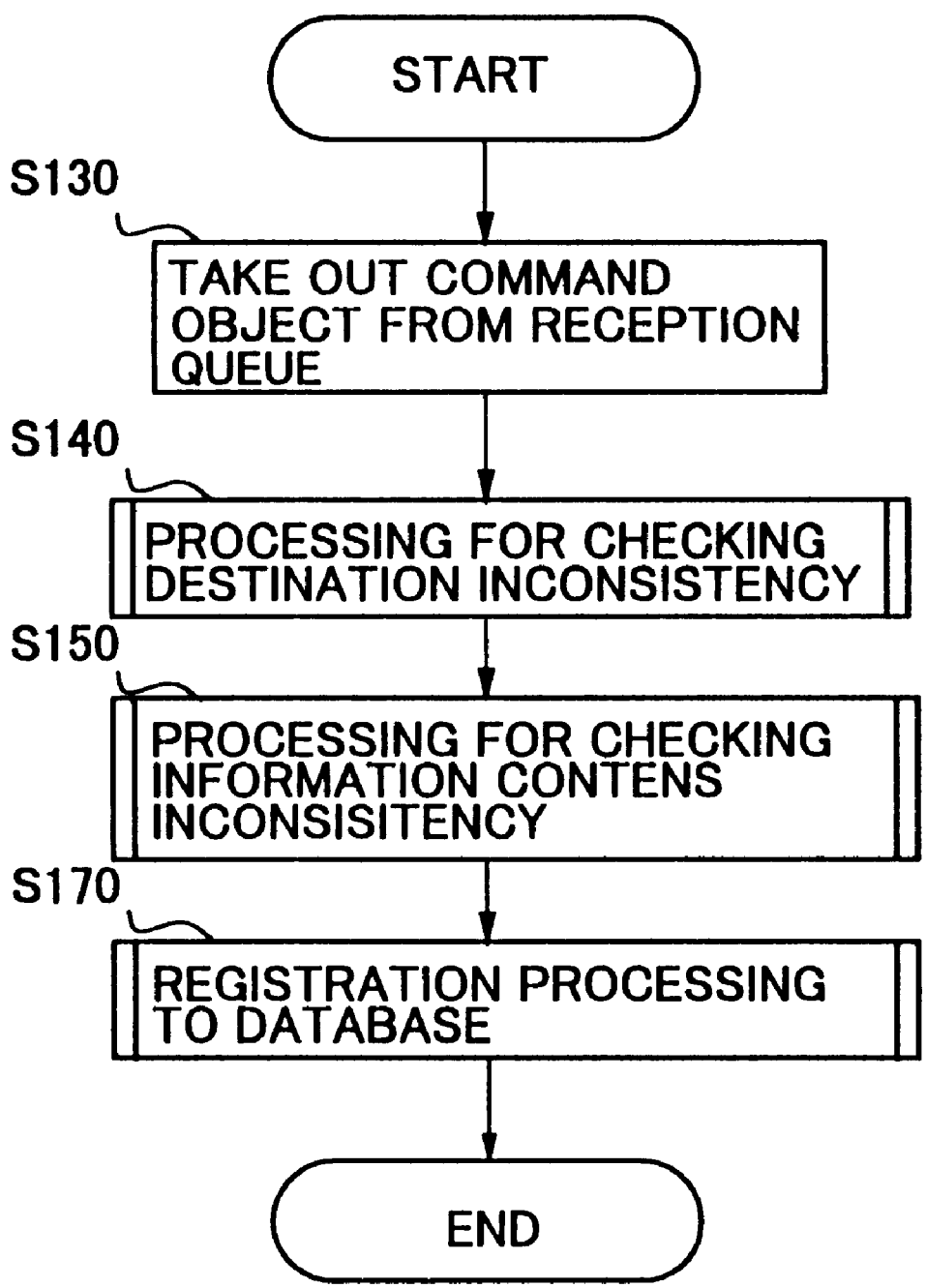
FIG. 20 is a flow chart showing a process of a received information.

FIG. 20 shows a main routine.

At step 130, one of the communicative informations is taken out from the reception queue 20.

At step 140, there is called a subroutine (FIG. 21) for performing a processing for checking destination inconsistency.

At step 150, there is called a subroutine (FIG. 22) for performing a processing for checking inconsistency in information contents.

At step 170, there is called a subroutine (FIG. 23) for performing a registration processing to the database 12.

Figure 21:
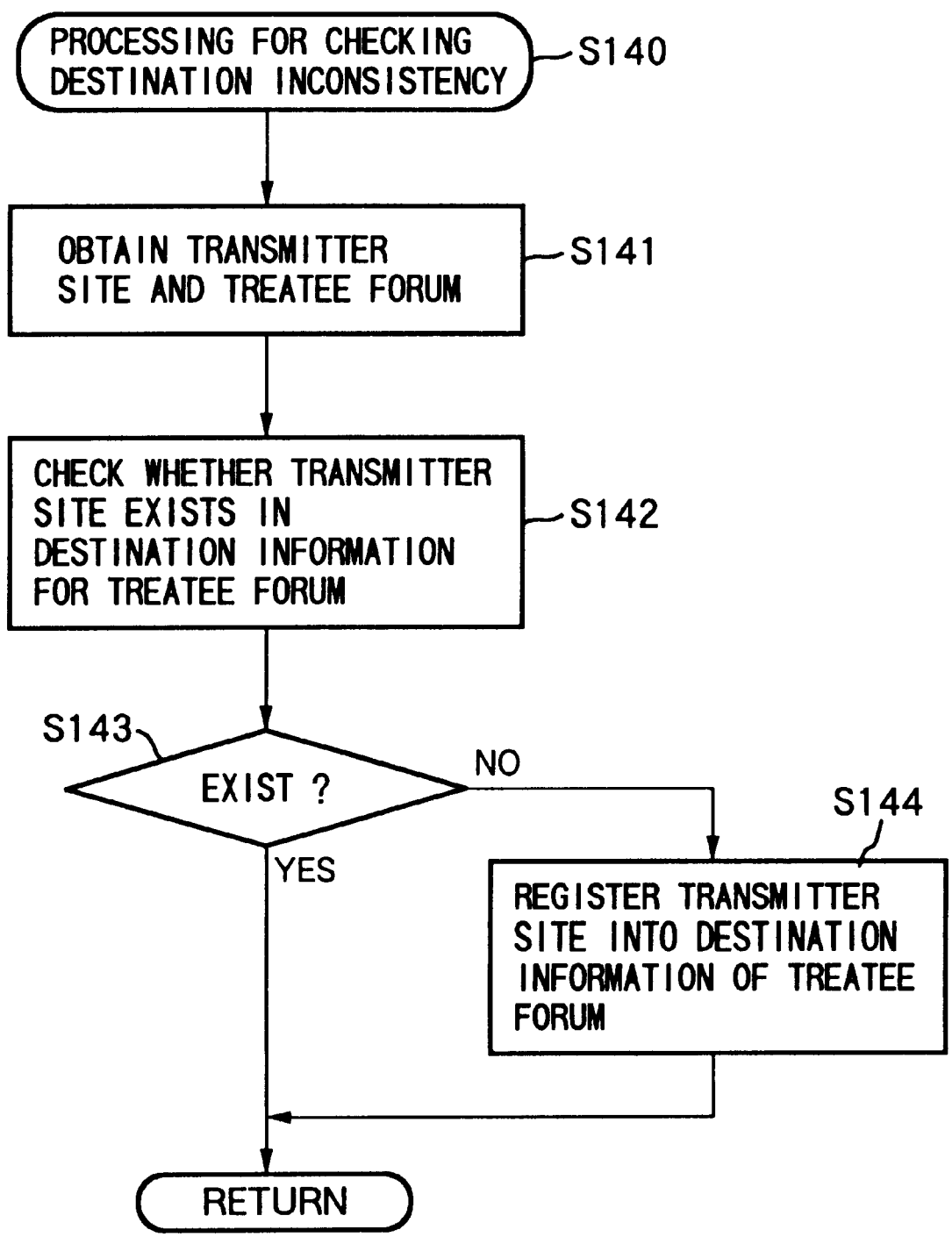
FIG. 21 is a flow chart showing a process for checking a destination inconsistency.

FIG. 21 shows the subroutine for performing the processing for checking destination inconsistency.

At step 141, there are analyzed those objects ID's which are included in one communicative information taken out from the reception queue 20, to thereby obtain a transmitter site and a treatee forum (forum to be treated).

At step 142, it is checked as to whether the transmitter site obtained at step 141 exists in the destination-information for the treatee forum registered in the database 12, or not.

At step 143, there is performed a branching processing. Namely, this routine is terminated if the transmitter site exists in the destination-information of the treatee forum (Yes). Contrary, the flow branches to step 144 if the transmitter site does not exist in the destination-information for the treatee forum (No).

At step 144, the transmitter site obtained at step 141 is additionally registered into the destination-information for the treatee forum registered in the database 12. It is possible, together with this processing, such as to indicate to the client 30 that an inconsistency has occurred in the destination so that the administrator of the electronic conference system can recognize the occurrence of inconsistency, at an early stage.

The processings at steps 141 through 143 correspond to the destination inconsistency judgment device, process and function. Further, the processing at step 144 corresponds to the destination inconsistency correction device, process and function.

According to the processings at steps 141 through 144 as explained above, automatically performed based on the communicative information are the inconsistency judgment and inconsistency correction of destination-information, even when an inconsistency has occurred in the destination-information at a certain site due to a certain reason. Thus, there is avoided an occurrence of such a situation that the information to be transmitted is not transmitted. As a result, the reliability of the electronic conference system can be considerably improved.

Figure 22:
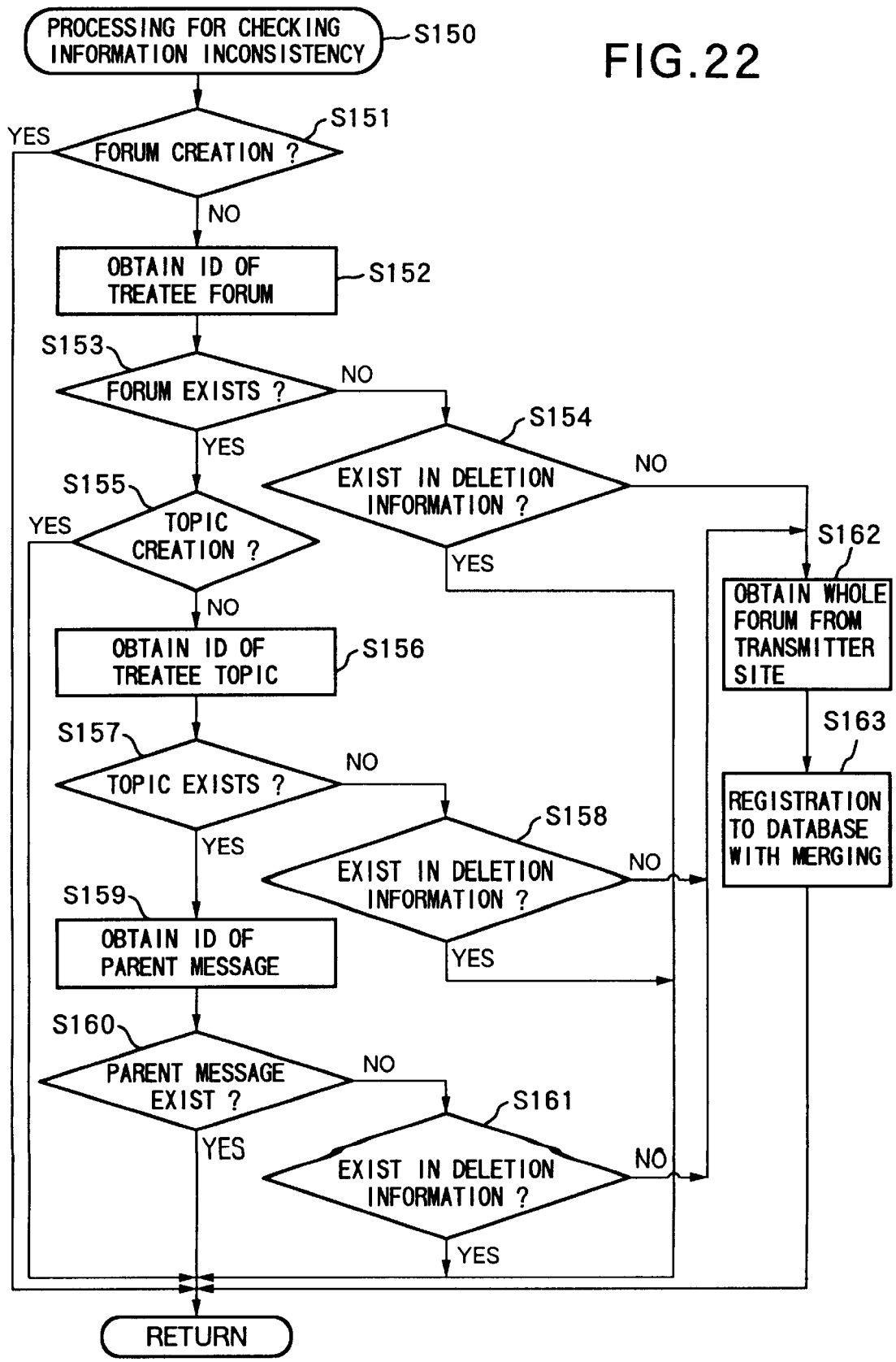
FIG. 22 is a flow chart showing a process for checking an inconsistency of information contents.

FIG. 22 shows a subroutine for performing a processing of inconsistency check for information contents.

In this respect, inconsistency in information contents occurs such as in the following cases. It is now assumed that the electronic conference system is constituted of sites A, B, C, D and E. Further, there are considered the information transmission paths in which the informations are transmitted from the site A to the site C via the site B, and from the site A to the site E via the site D, respectively. In this case, there may occur such a situation that the database 12 at the site D is recovered based on a recovery disk, but the database 12 returns, due to oldness of the recovery disk, to a state in which the site E is not registered as an information-exchange-destination of the site D. Then, the information is not transmitted from the site D to the site E. However, it is likely that the users of the site E do not find out that the information is not transmitted, resulting in failure of transmission of important information.

Thus, it is attained to improve the reliability of the electronic conference system, by automatically judging and correcting an occurrence of inconsistency in information contents, making use of inconsistency check processing for information contents, to be explained hereinafter.

At step 151, by analyzing the appropriate object ID included in the communicative information taken out from the reception queue 20, it is judged as to whether the processing is a forum creation, or not. This routine is terminated if it is the forum creation (Yes), but the flow branches to step 152 if it is not a forum creation (No). The processing at step 151 corresponds to the creation judgment device.

At step 152, there is obtained an object ID of a treatee forum, by analyzing object ID's included in the communicative information which has been taken out from the reception queue 20. Namely, there is performed a processing such as creation or update of objects, for the forum which is designated by the obtained object ID of the forum.

At step 153, it is judged as to whether the treatee forum exists in the database 12, or not. The flow branches to step 155 if the forum exists (Yes), or to step 154 if the forum does not exist (No).

At step 154, it is judged as to whether the object ID of treatee forum exists in the deletion information to be explained later, or not. This routine is terminated if the object ID of forum exists in the deletion information (Yes). If the object ID of forum does not exist, it is judged that an inconsistency has occurred in the information contents, so that the flow branches to step 162 (No).

The deletion information is an information for specifying a deleted object, in case that a deletion treatment of object is performed for the database 12 of a certain site. Concretely, a deletion information is created on the database 12 (deletion information registration device), and registered with an object ID for specifying the deleted object. In case that the object ID of the treatee forum exists in the deletion information, the forum has been deleted before information transmission thereto from other sites. Thus, it can be judged that no inconsistency in information has occurred. The same consideration can be adopted, in case that the treatee target is a message.

At step 155, by analyzing the appropriate object ID included in the communicative information taken out from the reception queue 20, it is judged as to whether the processing is a topic creation, or not. This routine is terminated if it is the topic creation (Yes), but the flow branches to step 156 if it is not a topic creation (No). The processing at step 155 corresponds to creation judgment device.

At step 156, there is obtained an object ID of a treatee topic, by analyzing the appropriate object ID included in the communicative information taken out from the reception queue 20.

At step 157, it is judged as to whether the treatee topic exists in the treatee forum, or not. The flow branches to step 159 if the topic exists (Yes), or to step 158 if the topic does not exist (No).

At step 158, it is judged as to whether the object ID of treatee topic exists in the deletion information, or not. This routine is terminated if the object ID of topic exists in the deletion information (Yes). If the object ID of topic does not exist, it is judged that an inconsistency has occurred in the information contents, so that the flow branches to step 162 (No).

At step 159, there is obtained an object ID of a "parent message of the treatee message" (hereinafter merely called "parent message"), by analyzing an appropriate object ID included in the communicative information taken out from the reception queue 20.

At step 160, it is judged as to whether the parent message designated by the obtained parent message ID exists in the treatee forum, or not. This routine is terminated if the parent message exists (Yes), or the flow branches to step 161 if the parent message does not exist (No).

At step 161, it is judged as to whether the object ID of treatee parent message exists in the deletion information, or not. This routine is terminated if the object ID of parent message exists in the deletion information (Yes). If the object ID of parent message does not exist, it is judged that an inconsistency has occurred in the information contents, so that the flow branches to step 162 (No).

The processings at steps 151 through 161 correspond to the inconsistency judgment device, inconsistency judgment process, and inconsistency judgment function.

At step 162, there is obtained an object ID designating a transmitter site, by analyzing the appropriate object ID included in the communicative information. Further, there is obtained the whole of treatee forum from the transmitter site, by specifying the transmitter site based on the obtained object ID.

At step 163, there is conducted an update registration of the database 12, while merging the forums registered in the database 12 with the forum obtained from the transmitter site.

The processings.at steps 162 and 163 correspond to the inconsistency correction device, inconsistency correction process, and inconsistency correction function.

According the above explained processings at steps 151 through 163, it is judged that an inconsistency has occurred in the information contents, if the treatee target object designated by the communicative information is not registered in the database 12 and does not exist in the deletion information, in case that the treatment content is not a forum creation nor topic creation. If it is judged that an inconsistency in the information contents has occurred, there is obtained the whole of forum from the transmitter site and there is conducted an update treatment for the database 12 together by mergence, to thereby correct the information contents. Thus, an inconsistency in the information contents can be automatically judged and corrected, so that the reliability of the electronic conference system can be also improved.

Figure 23:
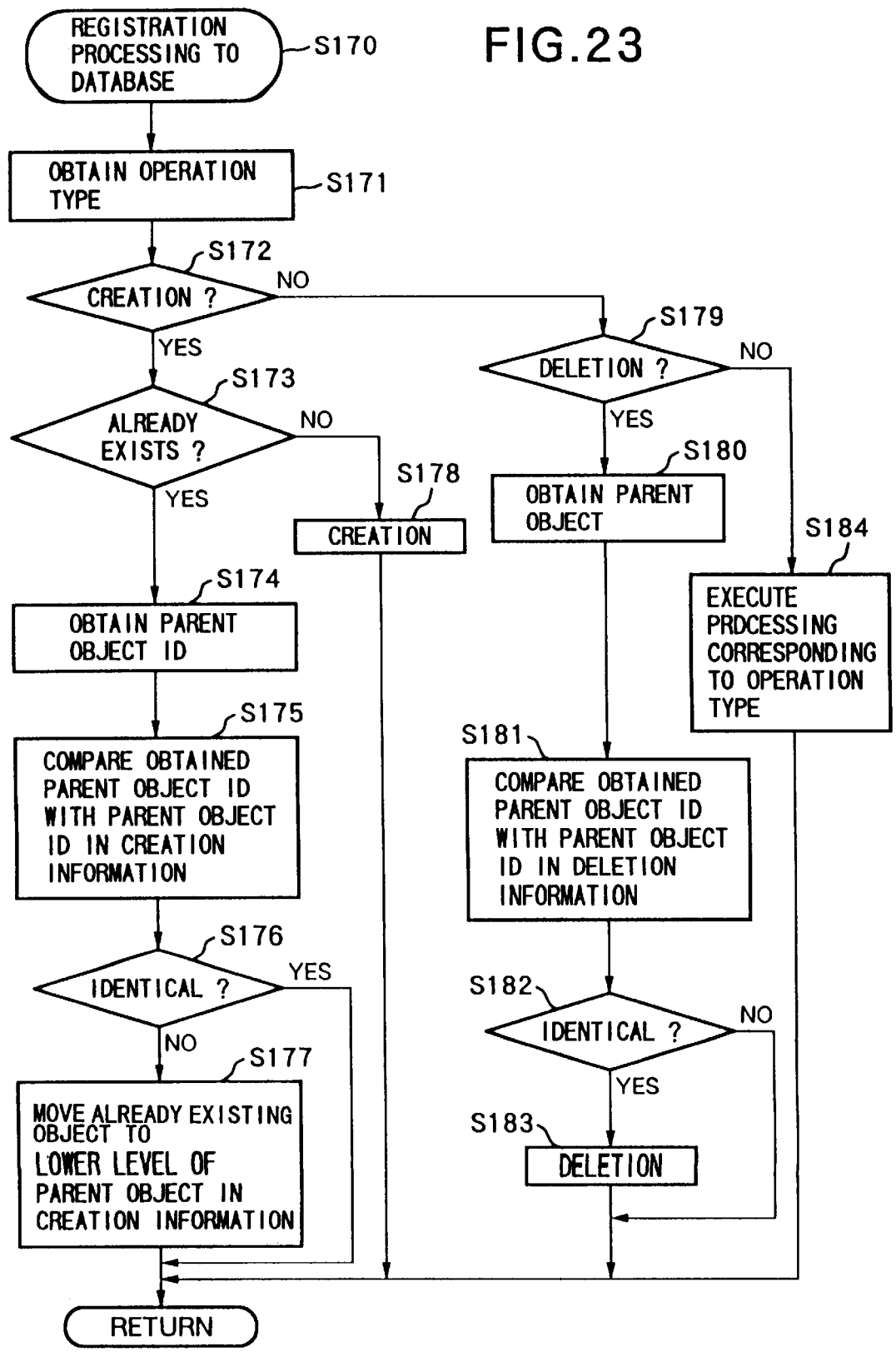
FIG. 23 is a flow chart showing a process for registration into the database.

FIG. 23 shows a subroutine for performing a registration processing to the database.

At step 171, there is obtained a type of operation (classification of creation, deletion, update or move of object; the same rule applies correspondingly to the following), by analyzing the appropriate object ID included in the communicative information taken out from the reception queue 20.

At step 172, it is judged as to whether the operation type is an object creation, or not. The flow branches to step 173 if it is the object creation (Yes), or to step 179 if it is not an object creation (No).

At step 173, it is judged as to whether the createe object already exists in the database 12, or not. The flow branches to step 174 if already exists (Yes), or to step 178 to create the object if not exists yet (No).

At step 174, there is retrieved an ID of parent object of the createe object, from the database 12.

At step 175, the retrieved parent object ID is compared with the parent object ID included in the communicative information, i.e., creation information.

At step 176, it is judged as to whether the retrieved parent object ID is identical with the parent object ID included in the communicative information, or not. This routine is terminated if the parent object ID's are identical with each other (Yes), but the flow branches to step 177 if the parent object ID's are not identical (No).

At step 177, there is performed an object move processing. Namely, in this object move processing, the createe object, which already exists, is moved to a lower level of the parent object designated by the transmitted creation information.

At step 179, it is judged as to whether the operation type is a deletion of object, or not. The flow branches to step 180 if it is the object deletion (Yes), or to step 184 if it is not an object deletion (No) to execute a processing corresponding to the operation type.

At step 180, there is obtained an ID of parent object of the deletee object, from the database 12.

At step 181, the obtained parent object ID is compared with the parent object ID included in the communicative information.

At step 182, it is judged as to whether the obtained parent object ID is identical with the parent object ID included in the communicative information, or not. The flow branches to step 183 if the parent object ID's are identical with each other (Yes), to perform an object deletion. Contrary, this routine is terminated while neglecting the command object, if the parent object ID's are not identical (No).

According to the above explained processings of steps 171 through 184, even in case of an object move between forums having information transmission paths different from each other, the object deletion and the object creation are executed at the move origination of the object and at the move destination of the object, respectively. As a result, regardless of the sequence of information transmission, the object move can be assuredly carried out.

Figure 24:
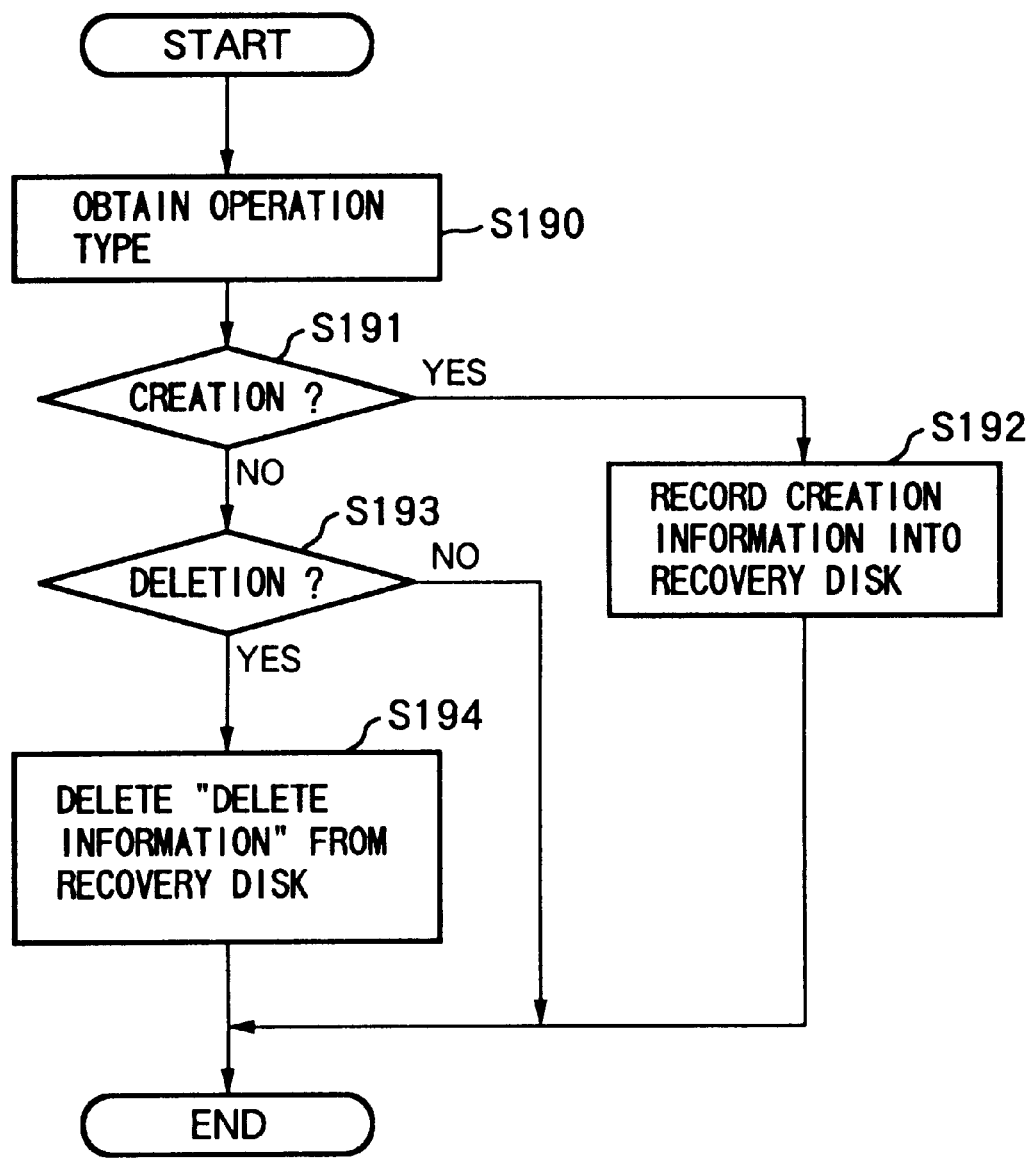
FIG. 24 is a flow chart showing a process for updating a recovery information.

FIG. 24 shows an update processing for a recovery information.

At step 190, there is obtained a type of operation, by analyzing the appropriate object ID included in the communicative information taken out from the reception queue 20.

At step 191, it is judged as to whether the operation type is an object creation, or not. If it is the object creation (Yes), the flow branches to step 192 to record, to a recovery disk, an object ID designating a createe object, and a destination-information designating its information-exchange-destination. The flow branches to step 193, if it is not an object creation (No).

At step 193, it is judged as to whether the operation type is an object deletion or not. If it is the object deletion, the flow branches to step 194 (Yes) to delete from the recovery disk: the object ID designating the deletee object; and the destination-information designating its information-exchangedestination. If it is not an object deletion (No), this routine is terminated.

According to the above explained processings at steps 190 through 194, the update of recovery disk is performed whenever such as an object creation is effected onto the database 12, so that the recovery disk is continuously kept at the latest state. In this concern, the recovery disk is recorded with not an object body itself but an object ID which designates such an object body, so that the update of recovery disk is quickly carried out. Thus, the response speed of the electronic conference system is never decreased.

In this embodiment, the update of recovery disk is executed whenever such as creation of object is performed to the database 12. However, it is possible that the update of recovery disk is executed according to instructions such as of the administrator of the electronic conference system, as will be described later. Further, it is advisable that the recovery disk is to be prepared in a manner physically different from the disk which constitutes the database 12.

Figure 25:
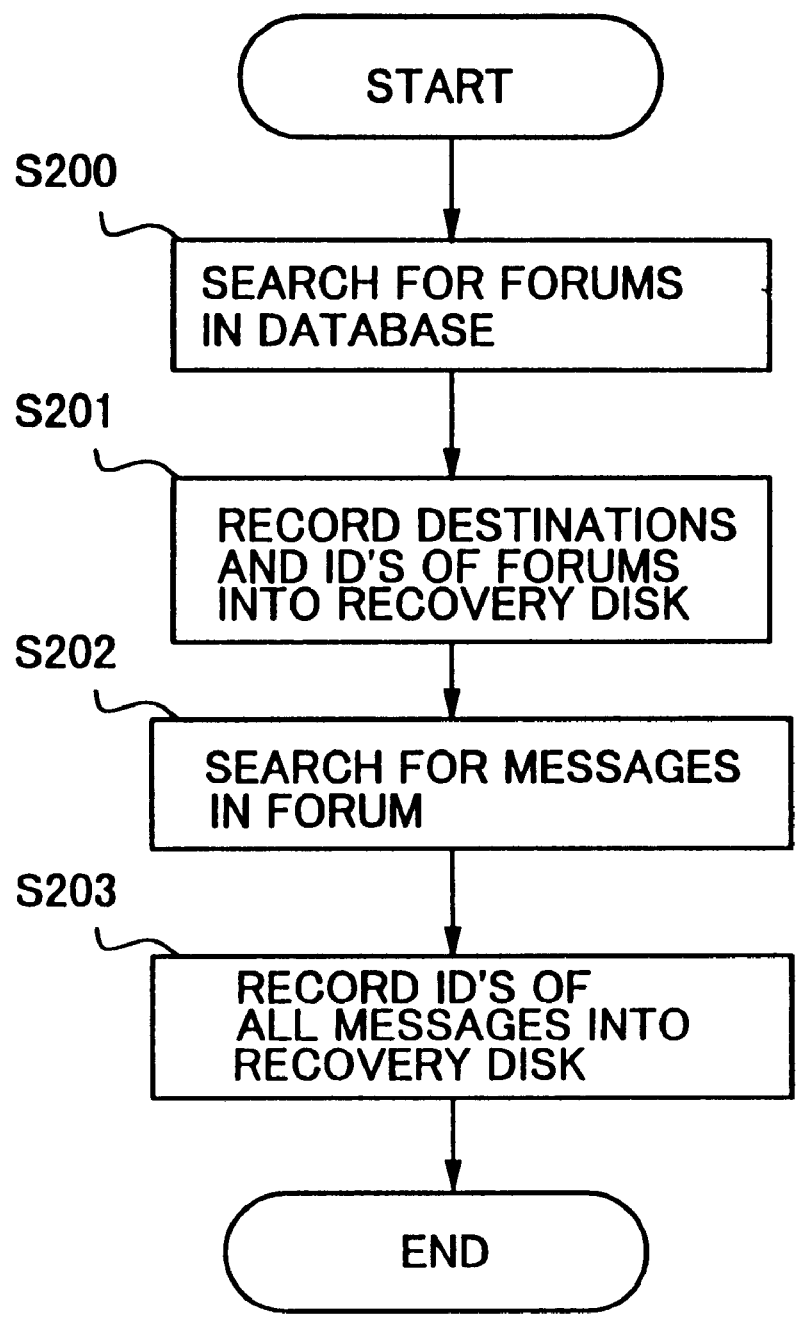
FIG. 25 is a flow chart also showing a process for updating a recovery information.

FIG. 25 shows an update processing of the recovery disk. This update processing of recovery disk is executed such as by the instructions of the administrator of electronic conference system.

At step 200, there are searched for all of the forums registered in the database 12.

At step 201, there are obtained those destinations which are information-exchange-destinations of the searched forums, and those object ID's, which designate these forums. Further, the obtained destinations and object ID's are registered into the recovery disk.

At step 202, there are searched for all of the messages included in the searched forums.

At step 203, the object ID's designating all of the searched messages are registered into the recovery disk.

According to the processing at steps 200 through 203 as explained above, upon update instructions such as from the administrator of the electronic conference system, there are recorded into the recovery disk, the destinations and object ID's of forums and the object ID's of messages included in the forums which are registered in the database 12. Namely, the recovery disk is recorded with not the true bodies of objects but the object ID's designating the objects, so that the update of recovery disk can be quickly carried out. Thus, regardless of the quantity of information, the administrator of the electronic conference system is allowed to conduct the update of recovery disk at appropriate time points, to thereby keep it at the latest state.

Figure 26:
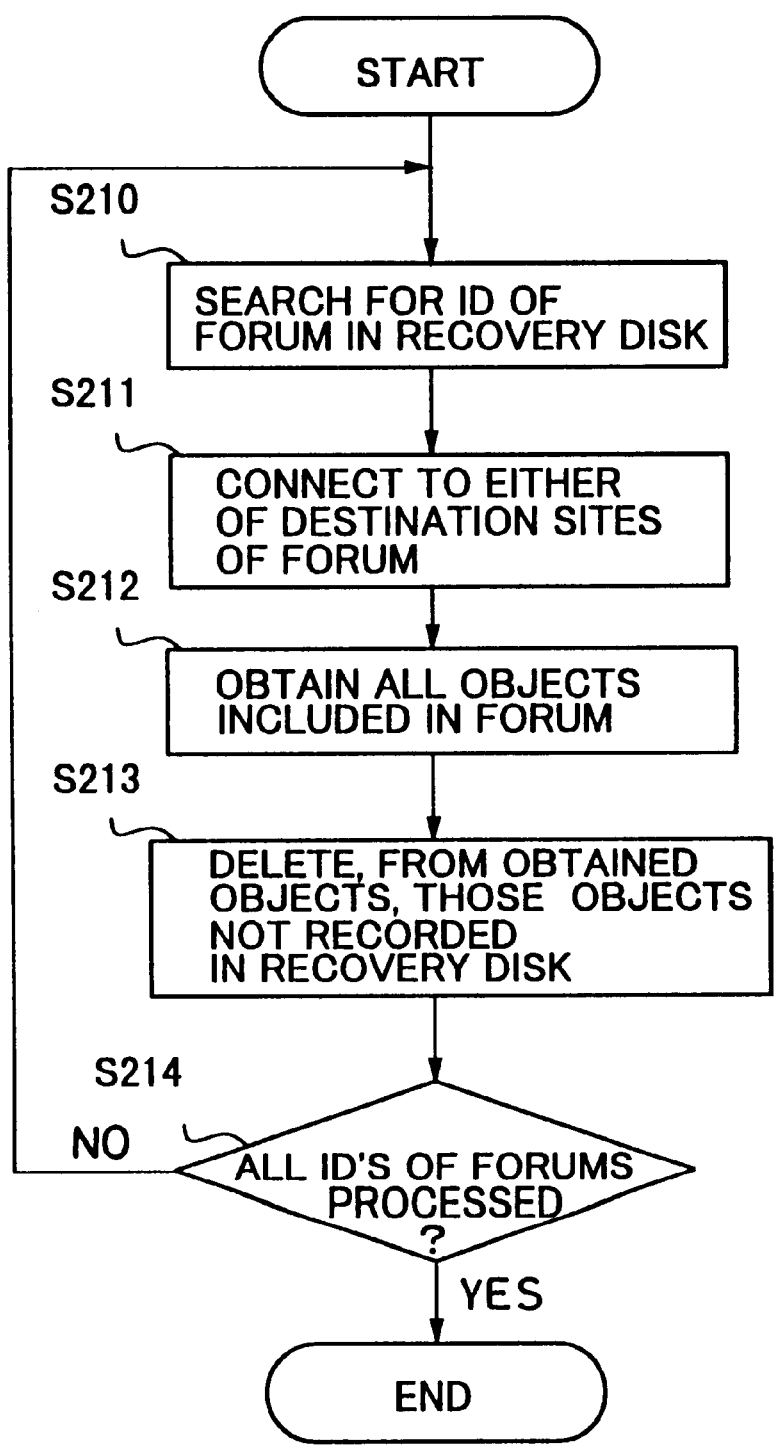
FIG. 26 is a flow chart showing a recovery process.

FIG. 26 shows a recovery processing of the database 12. This recovery processing of database 12 is executed such as by the instructions of the administrator of electronic conference system.

At step 210, there is searched for the ID of forum registered in the recovery disk.

At step 211, there are read out ID's of destinations which are information-exchange-destinations recorded in the recovery disk, and there is connected to the site which is specified by the read out ID of destination. Namely, in case that the ID's of destinations of forum A are the sites A and B, there is connected to the site A or to the site B. The connectee site may be determined such as in view of the vacancy or availability of the communication line 40.

At step 212, there are obtained all of the objects included in the forum searched for at step 210, from the connected site.

At step 213, there are deleted, from the obtained objects, those objects which are not registered in the recovery disk.

At step 214, it is judged as to whether all of the ID's of forums registered in the recovery disk have been processed or not. This routine is terminated, if all of the ID's of forums have been processed (Yes). Contrary, the flow branchingly goes back to step 210 to repeat the processings of steps 210 through 213, if all of the ID's of forum s have not been processed (No).

According to the processing at steps 210 through 214 as explained above, upon instructions to conduct a recovery of the database 12 such as from the administrator of the electronic conference system, there is obtained the whole of the required forum from other site via communication line 40. Further, there are deleted, from the obtained forums, those objects which are not registered in the recovery disk. This is because, there remains such a possibility that an operation at a certain site is not reflected to other site, due to the adoption of the store-and-forward type of communication system.

Based on the above, the database can be rapidly recovered to the state at the time of update of the recovery disk, i.e., the state just before the occurrence of trouble.

The recovery processing of the database 12 may be executed such that the objects included in a forum are obtained from other site after creating the forum based on the information registered in the recovery disk.

If those programs, which attain each of the above explained functions, respectively, are recorded in a medium such as paper card (punch card), paper tape, magnetic tape, magnetic disk, magnetic drum, IC card, or CD-ROM, it becomes possible to distribute the information inconsistency judgment program and the information inconsistency correction program, both according to the present invention. Then, those, who have obtained such a medium, can easily constitute an information inconsistency judgment apparatus and an information inconsistency correction apparatus, making use of a general electronic computer.

What is claimed is:

1. A store-and-forward type of electronic conference system, comprising:

a storage device storing operational information representing operations performed for hierarchical objects, whereas said stored operational information is transmitted in a batch between information administrating devices which register and administer the hierarchical objects, wherein said operational information includes a higher-level-information which specifies an object at a higher level of a treatee object; and an inconsistency judgment device judging an inconsistency in the transmitted operational information, at a time of treatment of received operational information, based on the object which is specified by said higher-level-information and the object which is registered in one of said information administrating devices.

2. A system according to claim 1, wherein said inconsistency judgment device judges an inconsistency in the transmitted operational information, when the object which is specified by said higher-level-information is not registered in the one of said information administrating devices.

3. A system according to claim 1, further comprising:

a deletion information registration device registering deletion information which specifies an object deleted from the one of said information administrating devices, wherein said inconsistency judging device judges an inconsistency in the transmitted operational information, when the object which is specified by said higher-level-information is not registered in the one of one of said information administering devices and said deletion information registration device.

4. A system according to claim 1, further comprising:

a creation judgment device judging an operation type creation of an object at a highest level, based on the received operational information, wherein said inconsistency judgment device judges an inconsistency in the transmitted operational information, when the object which is specified by said higher-level-information is not registered in the one of said information administrating devices and said creation judgment device judges that the operation type is other than the creation of the object at the highest level.

5. A store-and-forward type of electronic conference system, comprising:

a storage device storing operational information representing operations performed for hierarchical objects, whereas said stored operational information is transmitted in a batch between information administrating devices which register and administer the hierarchical objects, wherein said operational information includes a higher-level-information which specifies an object at a higher level of a treatee object;

an inconsistency judgment device judging an inconsistency in the transmitted operational information, at a time of treatment of received operational information, based on the object which is specified by said higher-level-information and the object which is registered in one of said information administrating devices; and an inconsistency correction device correcting the object which is registered in the one of said information administrating devices, based on the transmitted operational information, when said inconsistency judgment device judges an inconsistency in the transmitted operational information.

6. A system according to claim 5, wherein said inconsistency judgment device judges an inconsistency in the transmitted operational information, when the object which is specified by said higher-level-information is not registered in the one of said information administrating devices.

7. A system according to claim 5, further comprising a deletion information registration device registering deletion information which specifies an object deleted from the one of said information administrating devices, wherein said inconsistency judging device judges an inconsistency in the transmitted operational information, when the object which is specified by said higher-level-information is not registered in the one of said information administering devices and said deletion information registration device.

8. A system according to claim 5, wherein said operational information includes transmitter-information specifying one of the information administrating devices which transmitted said operational information, and said inconsistency correction device corrects the object registered in the one of said information administrating devices, by obtaining objects from the one of the information administrating devices which is specified by said transmitter information.

9. A system according to claim 5, further comprising:

a creation judgment device judging an operation type creation of an object at a highest level, based on the received operational information, wherein said inconsistency judgment device judges an inconsistency in the transmitted operational information, when the object which is specified by said higher-level-information is not registered in the one of said information administrating devices and said creation judgment device judges that the operation type is other than the creation of the object at the highest level.

10. A method of a store-and-forward type of electronic conference system, comprising:

storing operational information representing operations performed for hierarchical objects, whereas said stored operational information is transmitted in a batch between information administrating processes which register and administer the hierarchical objects, wherein said operational information includes a higher-level-information which specifies an object at a higher level of a treatee object; and judging an inconsistency in the transmitted operational information, at a time of treatment of received operational information, based on the object which is specified by said higher-level-information and the object which is registered in one of said information administrating processes.

11. A method according to claim 10, wherein said judging judges an inconsistency in the transmitted operational information, when the object which is specified by said higher-level-information is not registered in the one of said information administrating processes.

12. A method of a store-and-forward type of electronic conference system, comprising:

storing operational information representing operations performed for hierarchical objects whereas said stored operational information is transmitted in a batch between information administrating processes which register and administer the hierarchical objects, wherein said operational information includes a higher-level-information which specifies an object at a higher level of a treatee object;

judging an inconsistency in the transmitted operational information, at a time of treatment of received operational information, based on the object which is specified by said higher-level-information and the object which is registered in one of said information administrating processes; and correcting the object which is registered in the one of said information administrating processes, based on the transmitted operational information, when said judging judges an inconsistency in the transmitted operational information.

13. A method according to claim 12, wherein said judging judges an inconsistency in the transmitted operational information, when the object which is specified by said higher-level-information is not registered in the one of said information administrating processes.

14. A method according to claim 12, wherein said operational information includes transmitter-information specifying one of the information administrating processes which transmitted said operational information, and said correcting corrects the object registered in the one of said information administrating processes, by obtaining objects from the one of the information administrating processes which is specified by said transmitter-information.

15. A computer readable medium storing a program which when executed by a computer causes the computer to execute the functions in a store-and-forward type of electronic conference system, comprising:

storing operational information representing operations performed for hierarchical objects, whereas said stored operational information is transmitted in a batch between information administrating functions which register and administer the hierarchical objects, wherein said operational information includes a higher-level-information which specifies an object at a higher level of a treatee object; and judging an inconsistency in the transmitted operational information, at a time of treatment of received operational information, based on the object which is specified by said higher-level-information and the object which is registered in one of said information administrating functions.

16. A computer readable medium according to claim 15, wherein said judging judges an inconsistency in the transmitted operational information, when the object which is specified by said higher-level-information is not registered in the one of said information administrating functions.

17. A computer readable medium storing a program which when executed by a computer causes the computer to execute the functions in a store-and-forward type of electronic conference system, comprising:

storing operational information representing operations performed for hierarchical objects, whereas said stored operational information is transmitted in a batch between information administrating functions which register and administer the hierarchical objects, wherein said operational information includes a higher-level-information which specifies an object at a higher level of a treatee object;

judging an inconsistency in the transmitted operational information, at a time of treatment of received operational information, based on the object which is specified by said higher-level-information and the object which is registered in one of said information administrating functions; and correcting the object which is registered in the one of said information administrating functions, based on the transmitted operational information, when said judging judges an inconsistency in the transmitted operational information.

18. A computer readable medium according to claim 17, wherein said judging judges an inconsistency in the transmitted operational information, when the object which is specified by said higher-level-information is not registered in the one of said information administrating functions.

19. A computer readable medium according to claim 17, wherein said operational information includes transmitter-information specifying one of the information administrating functions which transmitted said operational information, and said correcting corrects the object registered in the one of said information administrating functions, by obtaining objects from the one of the information administrating functions which is specified by said transmitter-information.

20. An apparatus, comprising:

a storage device storing operational information for hierarchical objects, wherein said operational information is transmitted between information administrating devices which register the hierarchical objects; and an inconsistency judgement device judging an inconsistency in the transmitted information when the operational information is received, based on the object included in the operational information and the object registered in one of said information administrating devices.

21. An apparatus according to claim 20, wherein said inconsistency judgment device judges an inconsistency in the transmitted operational information, when the object included in the operational information is not registered in the one of said information administrating devices.

22. An apparatus according to claim 20, further comprising:

a deletion information registration device registering deletion information which specifies an object deleted from the one of said information administrating devices, wherein said inconsistency judging device judges an inconsistency in the transmitted operational information, when the object included in the operational information is not registered in the one of said information administrating devices and said deletion information registration device.

23. An apparatus according to claim 20, further comprising:

a creation judgment device judging an operation type creation of an object at a highest level, based on the received operational information, wherein said inconsistency judgment device judges an inconsistency in the transmitted operational information, when the object is not registered in the one of said information administrating devices and said creation judgment device judges that the operation type is other than the creation of the object at the highest level.

24. An apparatus, comprising:
a storage device storing operational information for hierarchical objects, wherein said operational information is transmitted between information administrating devices which register the hierarchical objects;
an inconsistency judgement device judging an inconsistency in the transmitted information when the operational information is received, based on the object included in the operational information and the object registered in one of said information administrating devices; and
an inconsistency correction device correcting the object which is registered in the one of said information administrating devices, based on the transmitted operational information, when said inconsistency judgment device judges an inconsistency in the transmitted operational information.

25. An apparatus according to claim 24, wherein said inconsistency judgment device judges an inconsistency in the transmitted operational information, when the object included in the operational information is not registered in the one of said information administrating devices.

26. An apparatus according to claim 24, further comprising:
a deletion information registration device registering deletion information which specifies an object deleted from the one of said information administrating devices, wherein said inconsistency judging device judges an inconsistency in the transmitted operational information, when the object included in the operational information is not registered in the one of said information administrating devices and said deletion information registration device.

27. An apparatus according to claim 24, wherein said operational information includes transmitter-information specifying one of the information administrating device which transmitted said operational information, and said inconsistency correction device corrects the object registered in the one of said information administrating devices, by obtaining objects from the one of the information administrating devices which is specified by said transmitter-information.

28. An apparatus according to claim 24, further comprising:
a creation judgment device judging an operation type creation of an object at a highest level, based on the received operational information, wherein said inconsistency judgment device judges an inconsistency in the transmitted operational information, when the object is not registered in the one of said information administrating devices and said creation judgment device judges that the operation type is other than the creation of the object at the highest level.

29. A method, comprising:
storing operational information for hierarchical objects, wherein said operational information is transmitted between information administrating processes which register the hierarchical objects; and
judging an inconsistency in the transmitted information when the operational information is received, based on the object included in the operational information and the object registered in one of said information administrating processes.

30. A method according to claim 29, wherein said judging judges an inconsistency in the transmitted operational information, when the object included in the operational information is not registered in the one of said information administrating processes.

31. A method, comprising:
storing operational information for hierarchical objects, wherein said operational information is transmitted between information administrating processes which register the hierarchical objects;
judging an inconsistency in the transmitted information when the operational information is received, based on the object included in the operational information and the object registered in one of said information administrating processes; and
correcting the object which is registered in the one of said information administrating processes, based on the transmitted operational information, when said judging judges an inconsistency in the transmitted operational information.

32. A method according to claim 31, wherein said judging judges an inconsistency in the transmitted operational information, when the object included in the operational information is not registered in the one of said information administrating processes.

33. A method according to claim 31, wherein said operational information includes transmitter-information specifying one of the information administrating processes which transmitted said operational information, and said correcting corrects the object registered in the one of said information administrating processes, by obtaining objects from the one of the information administrating processes which is specified by said transmitter-information.

34. A computer readable medium, comprising:
storing operational information for hierarchical objects, wherein said operational information is transmitted between information administrating functions which register the hierarchical objects; and
judging an inconsistency in the transmitted information when the operational information is received, based on the object included in the operational information and the object registered in one of said information administrating functions.

35. A computer readable medium according to claim 34, wherein said judging judges an inconsistency in the transmitted operational information, when the object included in the operational information is not registered in the one of said information administrating functions.

36. A computer readable medium, comprising:
storing operational information for hierarchical objects, wherein said operational information is transmitted between information administrating functions which register the hierarchical objects;
judging an inconsistency in the transmitted information when the operational information is received, based on the object included in the operational information and the object registered in one of said information administrating functions; and
correcting the object which is registered in the one of said information administrating functions, based on the transmitted operational information, when said judging judges an inconsistency in the transmitted operational information.

37. A computer readable medium according to claim 36, wherein said judging judges an inconsistency in the transmitted operational information, when the object included in the operational information is not registered in the one of said information administrating functions.

38. A computer readable medium according to claim 36, wherein said operational information includes transmitter-information specifying one of the information administrating functions which transmitted said operational information, and said correcting corrects the object registered in the one of said information administrating functions, by obtaining objects from the one of the information administrating functions which is specified by said transmitter-information.

* * * * *

UNITED STATES PATENT AND TRADEMARK OFFICE
CERTIFICATE OF CORRECTION

PATENT NO. : 6,229,825 B1
DATED : May 8, 2001
INVENTOR(S) : Minoru Nitta et al.

Page 1 of 1

It is certified that error appears in the above-identified patent and that said Letters Patent is hereby corrected as shown below:

Column 29,
Lines 7-8, delete paragraph break.

Column 30,
Line 13, delete "a".

Signed and Sealed this

Twenty-fifth Day of December, 2001

Attest:

JAMES E. ROGAN
Attesting Officer
*Director of the United States Patent and Trademark Office*